(12) United States Patent
Kim et al.

(10) Patent No.: US 11,036,578 B2
(45) Date of Patent: Jun. 15, 2021

(54) SEMICONDUCTOR MEMORY DEVICES AND MEMORY SYSTEMS INCLUDING THE SAME

(71) Applicant: SAMSUNG ELECTRONICS CO., LTD., Suwon-si (KR)

(72) Inventors: Dae-Hyun Kim, Suwon-si (KR); Yong-Gyu Chu, Seoul (KR); Jun Jin Kong, Yongin-si (KR); Ki-Jun Lee, Seoul (KR); Myung-Kyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 16/217,249

(22) Filed: Dec. 12, 2018

(65) Prior Publication Data

US 2019/0340067 A1 Nov. 7, 2019

(30) Foreign Application Priority Data

Apr. 12, 2018 (KR) .................. 10-2018-0042701
Jun. 8, 2018 (KR) .................. 10-2018-0065750

(51) Int. Cl.
*G06F 11/10* (2006.01)
*G11C 29/52* (2006.01)
(Continued)

(52) U.S. Cl.
CPC ...... *G06F 11/1068* (2013.01); *G06F 13/1668* (2013.01); *G11C 11/401* (2013.01);
(Continued)

(58) Field of Classification Search
CPC .............. G06F 21/554; G06F 11/1012; G06F 11/1032; G06F 13/1668; G06F 11/1068;
(Continued)

(56) References Cited

U.S. PATENT DOCUMENTS 5,535,226 A    7/1996  Drake et al.
7,257,763 B1 * 8/2007  Srinivasan .......... G06F 11/1064
                                                     714/718

(Continued)

*Primary Examiner* — April Y Blair
*Assistant Examiner* — Sazzad Hossain
(74) *Attorney, Agent, or Firm* — F. Chau & Associates, LLC

(57) ABSTRACT

A semiconductor memory device includes: a memory cell array including a plurality of memory cells; an error correction code (ECC) engine configured to detect and/or correct at least one error bit in read data and configured to generate a decoding status flag indicative of whether the at least one error bit is detected and/or corrected, wherein the read data is read from the memory cell array; a channel interface circuit configured to receive the read data and the decoding status flag from the ECC engine and configured to transmit the read data and the decoding status flag to a memory controller, wherein the channel interface circuit is configured to transmit the decoding status flag to the memory controller through a pin; and a control logic circuit configured to control the ECC engine and the channel interface circuit in response to an address and a command from the memory controller.

19 Claims, 22 Drawing Sheets

(51) Int. Cl.
  *G06F 13/16*    (2006.01)
  *G11C 11/401*   (2006.01)
  *H01L 25/065*   (2006.01)
  *G11C 11/4096*  (2006.01)
  *G11C 29/42*    (2006.01)
  *G06F 21/55*    (2013.01)

(52) U.S. Cl.
  CPC .......... *G11C 29/52* (2013.01); *H01L 25/0657* (2013.01); *G06F 11/1012* (2013.01); *G06F 11/1032* (2013.01); *G06F 21/554* (2013.01); *G11C 11/4096* (2013.01); *G11C 29/42* (2013.01); *H01L 2225/06513* (2013.01); *H01L 2225/06541* (2013.01)

(58) Field of Classification Search
  CPC ..... G11C 29/52; G11C 11/4096; G11C 29/42; G11C 11/401; H01L 25/0657; H01L 2225/06513; H01L 2225/06541
  See application file for complete search history.

(56) References Cited

U.S. PATENT DOCUMENTS

| | | | |
|---|---|---|---|
| 7,373,583 B2 | 5/2008 | Hummler | |
| 7,464,315 B2 | 12/2008 | Ito et al. | |
| 8,799,744 B2 | 8/2014 | Takizawa | |
| 8,880,974 B2 | 11/2014 | Pawlowski et al. | |
| 9,454,422 B2 | 9/2016 | Coteus et al. | |
| 9,529,672 B2 | 12/2016 | Alam et al. | |
| 9,881,656 B2 | 1/2018 | West et al. | |
| 9,891,987 B2 | 2/2018 | Kodera et al. | |
| 2005/0005054 A1* | 1/2005 | Jang | G11C 7/1006 711/1 |
| 2006/0236206 A1* | 10/2006 | Otsuka | G06F 11/1032 714/763 |
| 2007/0047306 A1* | 3/2007 | Roohparvar | G06F 11/1068 365/185.09 |
| 2008/0109700 A1* | 5/2008 | Lee | G06F 11/1008 714/758 |
| 2011/0153939 A1* | 6/2011 | Choi | G11C 11/407 711/118 |
| 2011/0161784 A1* | 6/2011 | Selinger | G06F 11/1068 714/768 |
| 2013/0117620 A1* | 5/2013 | Joo | G11C 16/3418 714/746 |
| 2014/0047305 A1* | 2/2014 | Pawlowski | G06F 11/1044 714/785 |
| 2016/0357630 A1* | 12/2016 | Kang | G11C 5/025 |

* cited by examiner

SEMICONDUCTOR MEMORY DEVICES AND MEMORY SYSTEMS INCLUDING THE SAME

CROSS-REFERENCE TO RELATED APPLICATIONS

This application claims priority under 35 U.S.C. § 119 to Korean Patent Application No. 10-2018-0042701, filed on Apr. 12, 2018 and to Korean Patent Application No. 10-2018-0065750, filed on Jun. 8, 2018, in the Korean Intellectual Property Office, the disclosures of which are incorporated by reference herein in their entireties.

TECHNICAL FIELD

The present inventive concept relates to memories, and more particularly, to semiconductor memory devices and memory systems including the same.

DISCUSSION OF RELATED ART

Semiconductor memory devices may be classified into non-volatile memory devices and volatile memory devices. Non-volatile memory devices can retrieve stored information even after having been power cycled. In contrast, volatile memory devices need constant power to retain data. Examples of non-volatile memory devices include flash memory devices. Examples of volatile memory devices include dynamic random access memories (DRAMs). Due to their high speed operation and low cost, DRAMs are increasingly used for system memories. However, as DRAMs decrease in size, bit errors of memory cells in the DRAMs may rapidly increase and yield of the DRAMs may decrease.

SUMMARY

According to exemplary embodiments of the present inventive concept, a semiconductor memory device includes: a memory cell array including a plurality of memory cells; an error correction code (ECC) engine configured to detect and/or correct at least one error bit in read data and configured to generate a decoding status flag indicative of whether the at least one error bit is detected and/or corrected, wherein the read data is read from the memory cell array; a channel interface circuit configured to receive the read data and the decoding status flag from the ECC engine and configured to transmit the read data and the decoding status flag to a memory controller, wherein the channel interface circuit is configured to transmit the decoding status flag to the memory controller through a first pin; and a control logic circuit configured to control the ECC engine and the channel interface circuit in response to an address and a command provided from the memory controller.

According to exemplary embodiments of the present inventive concept, a semiconductor memory device includes: a memory cell array including a plurality of memory cells; an ECC engine configured to detect and/or correct at least one error bit in read data and configured to generate a decoding status flag indicative of whether the at least one error bit is detected and/or corrected, wherein the read data is read from the memory cell array; a channel interface circuit configured to receive the read data and the decoding status flag from the ECC engine, configured to store the decoding status flag in a register therein and configured to transmit the read data to a memory controller; and a control logic circuit configured to control the ECC engine and the channel interface circuit in response to an address and a command provided from the memory controller, and wherein the control logic circuit is configured to control the channel interface circuit to transmit the decoding status flag to the memory controller.

According to exemplary embodiments of the present inventive concept, a memory system includes: a semiconductor memory device; and a memory controller configured to control the semiconductor memory device, wherein the semiconductor memory device includes: a memory cell array including a plurality of memory cells; an ECC engine configured to detect and/or correct at least one error bit in read data and configured to generate a decoding status flag indicative of whether the at least one error bit is detected and/or corrected, wherein the read data is read from the memory cell array; a channel interface circuit configured to receive the read data and the decoding status flag from the ECC engine and configured to transmit the read data and the decoding status flag to the memory controller, wherein the channel interface circuit is configured to transmit the decoding status flag to the memory controller through a first pin; and a control logic circuit configured to control the ECC engine and the channel interface circuit in response to an address and a command provided from the memory controller, and wherein the memory controller is configured to determine an error management policy of the semiconductor memory device based on the decoding status flag.

According to exemplary embodiments of the present inventive concept, a semiconductor memory device includes: a memory cell array including a plurality of memory cells; an ECC engine configured to detect and/or correct at least one error bit in data read from the memory cell array and configured to generate a decoding status flag indicative of whether the at least one error bit is detected and/or corrected; and a channel interface circuit configured to receive corrected read data and the decoding status flag from the ECC engine and configured to transmit the corrected read data and the decoding status flag to a memory controller.

BRIEF DESCRIPTION OF THE DRAWINGS

Exemplary embodiments of the present inventive concept will be described below in more detail with reference to the accompanying drawings.

DETAILED DESCRIPTION OF THE EMBODIMENTS

Exemplary embodiments of the present inventive concept will be described more fully hereinafter with reference to the accompanying drawings.

Figure 1:
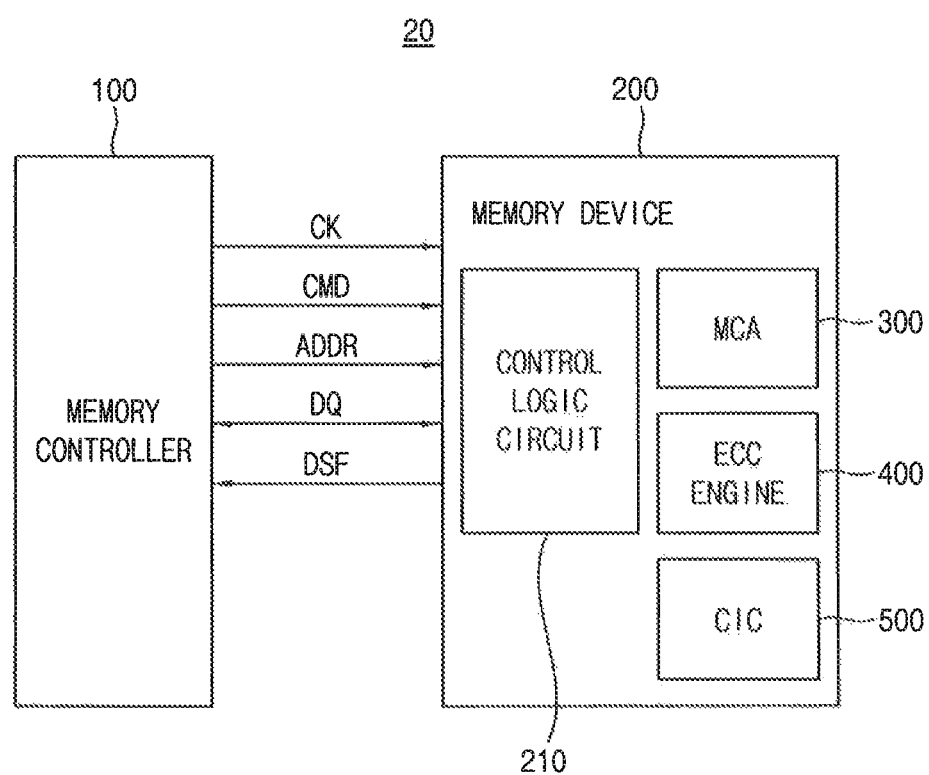
FIG. 1 is a block diagram illustrating a memory system according to an exemplary embodiment of the present inventive concept.

FIG. 1 is a block diagram illustrating a memory system according to an exemplary embodiment of the present inventive concept.

Referring to FIG. 1, a memory system 20 may include a memory controller 100 and at least one semiconductor memory device 200.

The memory controller 100 may control the overall operation of the memory system 20. The memory controller 100 may control the overall data exchange between an external host and the semiconductor memory device 200. For example, the memory controller 100 may write data to the semiconductor memory device 200 or read data from the semiconductor memory device 200 in response to a request from the host. In addition, the memory controller 100 may issue operation commands to the semiconductor memory device 200 for controlling the semiconductor memory device 200.

In exemplary embodiments of the present inventive concept, the semiconductor memory device 200 is a memory device including dynamic memory cells such as a dynamic random access memory (DRAM), double data rate 4 (DDR4) synchronous DRAM (SDRAM), a low power DDR4 (LPDDR4) SDRAM, a LPDDR5 SDRAM or a graphic DDR (GDDR) memory device. In exemplary embodiments of the present inventive concept, the semiconductor memory device 200 may be a static random access memory (SRAM) device including static memory cells (or bit cells).

The memory controller 100 transmits a clock signal CK, a command CMD, and an address signal ADDR to the semiconductor memory device 200 and exchanges data DQ with the semiconductor memory device 200. The semiconductor memory device 200 may transmit a decoding status flag DSF to the memory controller 100. The decoding status flag DSF may include information on whether at least one error bit is detected and/or corrected in the semiconductor memory device 200.

The decoding status flag DSF may include one bit or two or more bits. When the decoding status flag DSF includes one bit, the decoding status flag DSF has a low level when the error bit is not detected and the decoding status flag DSF has a high level when one or more error bits is/are detected. Alternatively, the decoding status flag DSF has a low level when the error bit is not detected or one error bit is detected, and the decoding status flag DSF has a high level when two or more error bits are detected.

When the decoding status flag DSF includes two bits, the decoding status flag DSF has '00' when the error bit is not detected, the decoding status flag DSF has '01' when one error bit is detected and the decoding status flag DSF has '10' when two or more error bits are detected. The decoding status flag DSF has a fixed value and the memory controller 100 sets a mode register set in the semiconductor memory device 200 to change a state of an error bit represented by the decoding status flag DSF.

The semiconductor memory device 200 includes a memory cell array 300 that stores the data DQ, an error correction code (ECC) engine 400, a control logic circuit 210 and a channel interface circuit 500.

The ECC engine 400 may read data from a target page of the memory cell array 300 by unit of a codeword, and perform an ECC decoding on the data. The ECC engine 400 may then provide the channel interface circuit 500 with the decoding status flag DSF associated with processing at least one error bit when the data includes the at least one error bit. These functions performed by the ECC engine 400 are done under control of the control logic circuit 210.

The channel interface circuit 500 receives corrected data (or the data DQ) and the decoding status flag DSF and may transmit the data DQ and the decoding status flag DSF to the memory controller 100. The channel interface circuit 500 may transmit the decoding status flag DSF to the memory controller 100 through a first pin of the semiconductor memory device 200 in real time. The first pin may be a pin through which the semiconductor memory device 200 receives a data inversion bit associated with the data DQ from the memory controller 100. The first pin may also a pin through which the semiconductor memory device 200 receives the data DQ from the memory controller 100. For example, the first pin may be a data mask through which the semiconductor memory device 200 receives a data mask signal to determine whether to write predetermined data bits.

The channel interface circuit 500 may transmit the decoding status flag DSF in parallel with the data DQ to the memory controller 100, and the memory controller 100 may correct the error bit in the data DQ based on the decoding status flag DSF or may determine an error management policy of the semiconductor memory device 200 based on the decoding status flag DSF.

Figure 2:
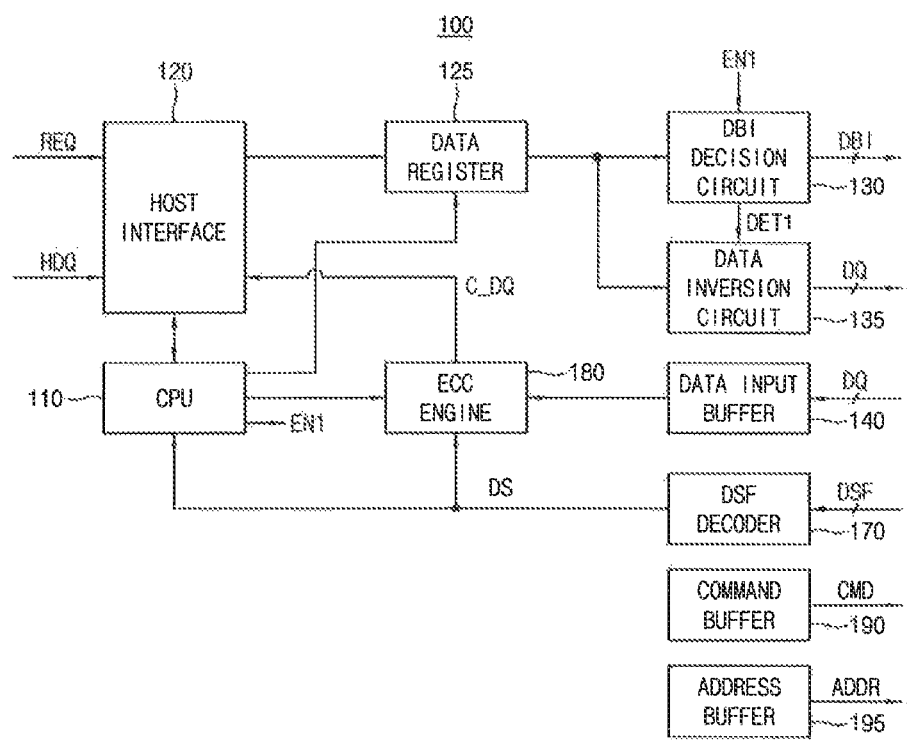
FIG. 2 is a block diagram illustrating a memory controller in FIG. 1 according to an exemplary embodiment of the present inventive concept.

FIG. 2 is a block diagram illustrating the memory controller in FIG. 1 according to an exemplary embodiment of the present inventive concept.

Referring to FIG. 2, the memory controller 100 includes a central processing unit (CPU) 110, a host interface 120, a data register 125, a data inversion decision circuit 130, a data inversion circuit 135, a data input buffer 140, a decoding status flag decoder 170, an ECC engine 180, a command buffer 190, an address buffer 195.

The host interface 120 receives a request REQ and host data HDQ and provides the host data HDQ to the data register 125.

The data register 125 continuously (or sequentially) outputs the host data HDQ to the data inversion decision circuit 130 and the data inversion circuit 135. The host data HDQ may include a plurality of unit data.

The data inversion decision circuit 130 counts a number of first data bits having a first logic level, in each unit data of the host data HDQ, and provides a decision signal DET1 indicating whether to invert each unit data, based on the counting. The data inversion circuit 135 selectively inverts the unit data to output the data DQ in response to the decision signal DET1.

For example, when the first logic level is a logic low level ('0'), the data inversion decision circuit 130 outputs the decision signal DET1 with the first logic level to the data inversion circuit 135 when a number of the first data bits in each unit data is greater than a number of second data bits having a second logic level. When the data inversion circuit 135 receives the decision signal DET1 having the first logic level, the data inversion circuit 135 inverts data bits of corresponding unit data. The data inversion decision circuit 130 outputs the decision signal DET1 for each of the unit data as the data inversion bits DBI.

Data bit inversion is a technique for current reduction. Here, for example, to reduce consumption of a large amount of current in transmission lines terminated with a power voltage while transmitting a low-level signal, as compared with a high-level signal, if data includes a larger number of low-level bits than high-level bits, the data is converted to include half or fewer low-level bits than a total bits number. Thus, an additional signal indicating the data conversion is transmitted, thereby reducing current consumption.

The data input buffer 140 receives the data DQ from the semiconductor memory device 200 and provides the data DQ to the ECC engine 180.

The decoding status flag decoder 170 receives the decoding status flag DSF, decodes the decoding status flag DSF and provides the CPU 110 and the ECC engine 180 with a decoding signal DS indicating information of the decoding status flag DSF. When the ECC engine 400 has single bit error detection single bit error correction (SEDSEC) capabilities, the decoding status flag DSF and the decoding signal DS may be associated with information including one of a case in which no error is detected 'NE', a case in which one error bit is detected and corrected 'CE' and a case in which two or more error bits are detected and uncorrected 'UE'.

The command buffer 190 stores the command CMD corresponding to the request REQ and transmits the command CMD to the semiconductor memory device 200 under control of the CPU 110. The address buffer 195 stores the address ADDR and transmits the address ADDR to the semiconductor memory device 200 under control of the CPU 110.

The CPU 110 controls the data register 125 and the ECC engine 180 based on the request REQ and may selectively enable the data inversion decision circuit 130 by providing an enable signal EN1 to the data inversion decision circuit 130. In addition, the CPU 110 controls the ECC engine 180 to selectively correct the error bit in the data DQ and to provide corrected data C_DQ to the host interface 120.

In addition, the CPU 110 may determine an error management policy of the semiconductor memory device 200 based on the decoding status flag DSF. For example, when the data DQ includes error bits that exceed the error correction capability of the ECC engine 400, the CPU 110 controls the semiconductor memory device 200 to repair the error bits by using redundancy resources of the semiconductor memory device 200.

When a plurality of semiconductor memory devices such as the semiconductor memory device 200 are employed in a system such as an autonomous vehicle that demands high safety and credibility and the system includes Triple Modular Redundancy (TRM) memory, the memory controller 100 may determine not to use the semiconductor memory device (of the plurality of semiconductor memory devices) including a number of error bits that exceed the error correction capability of its ECC engine 400 to ensure safety.

Figure 3:
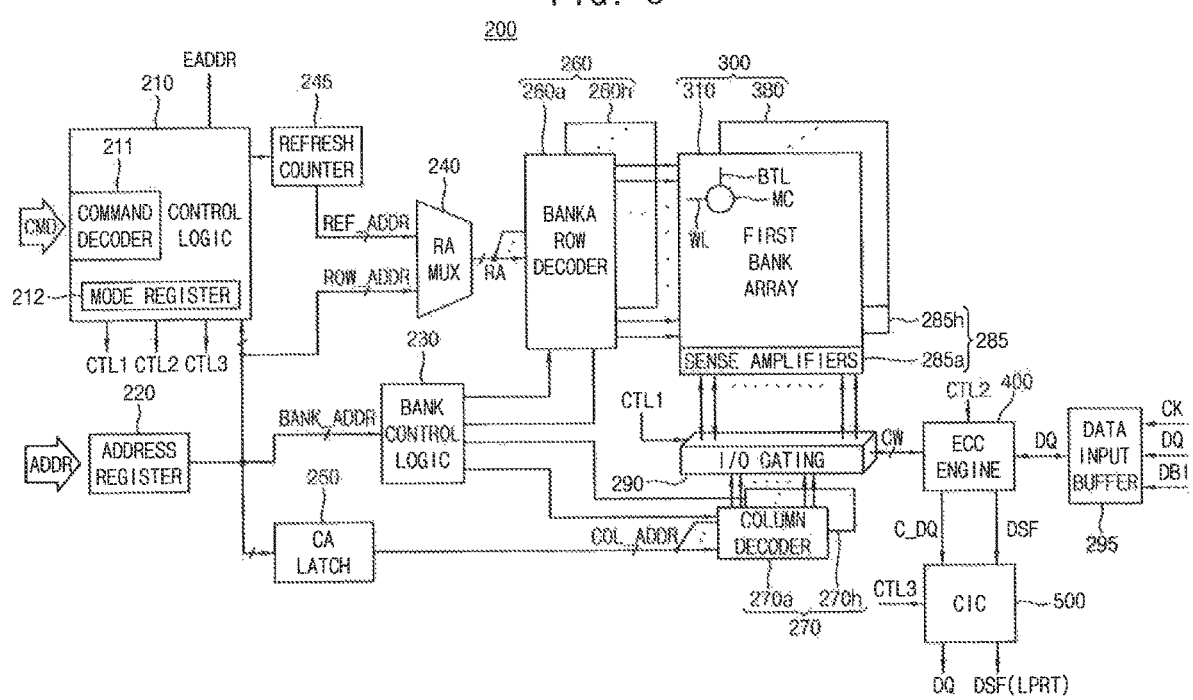
FIG. 3 is a block diagram illustrating a semiconductor memory device in FIG. 1 according to an exemplary embodiment of the present inventive concept.

FIG. 3 is a block diagram illustrating the semiconductor memory device in FIG. 1 according to an exemplary embodiment of the present inventive concept.

Referring to FIG. 3, the semiconductor memory device 200 includes the control logic circuit 210, an address register 220, a bank control logic 230, a refresh counter 245, a row address multiplexer 240, a column address latch 250, a row decoder 260, a column decoder 270, the memory cell array 300, a sense amplifier unit 285, an input/output (I/O) gating circuit 290, the ECC engine 400, the channel interface circuit 500 and a data input buffer 295.

The memory cell array 300 includes first through eighth bank arrays 310~380. The row decoder 260 includes first through eighth bank row decoders 260a~260h respectively coupled to the first through eighth bank arrays 310~380, the column decoder 270 includes first through eighth bank column decoders 270a~270h respectively coupled to the first through eighth bank arrays 310~380, and the sense amplifier unit 285 includes first through eighth bank sense amplifiers 285a~285h respectively coupled to the first through eighth bank arrays 310~380.

The first through eighth bank arrays 310~380, the first through eighth bank row decoders 260a~260h, the first through eighth bank column decoders 270a~270h and first through eighth bank sense amplifiers 285a~285h may form first through eighth banks. Each of the first through eighth bank arrays 310~380 includes a plurality of memory cells MC formed at intersections of a plurality of word-lines WL and a plurality of bit-lines BTL.

The address register 220 receives the address ADDR including a bank address BANK_ADDR, a row address ROW_ADDR and a column address COL_ADDR from the memory controller 100. The address register 220 provides the received bank address BANK_ADDR to the bank control logic 230, provides the received row address ROW- _ADDR to the row address multiplexer 240, and provides the received column address COL_ADDR to the column address latch 250.

The bank control logic 230 generates bank control signals in response to the bank address BANK_ADDR. One of the first through eighth bank row decoders 260a~260h corresponding to the bank address BANK_ADDR is activated in response to the bank control signals, and one of the first through eighth bank column decoders 270a~270h corresponding to the bank address BANK_ADDR is activated in response to the bank control signals.

The row address multiplexer 240 receives the row address ROW_ADDR from the address register 220, and receives a refresh row address REF_ADDR from the refresh counter 245. The row address multiplexer 240 selectively outputs the row address ROW_ADDR or the refresh row address REF_ADDR as a row address RA. The row address RA that is output from the row address multiplexer 240 is applied to the first through eighth bank row decoders 260a~260h.

The activated one of the first through eighth bank row decoders 260a~260h, by the bank control logic 230, decodes the row address RA that is output from the row address multiplexer 240, and activates a word-line WL corresponding to the row address RA. For example, the activated row decoder applies a word-line driving voltage to the word-line WL corresponding to the row address RA.

The column address latch 250 receives the column address COL_ADDR from the address register 220, and temporarily stores the received column address COL_ADDR. In exemplary embodiments of the present inventive concept, in a burst mode, the column address latch 250 generates column addresses that increment from the received column address COL_ADDR. The column address latch 250 applies the temporarily stored or generated column address to the first through eighth bank column decoders 270a~270h.

The activated one of the first through eighth bank column decoders 270a~270h activates a sense amplifier corresponding to the bank address BANK_ADDR and the column address COL_ADDR through the I/O gating circuit 290.

The I/O gating circuit 290 includes circuitry for gating input/output data, and further includes input data mask logic, read data latches for storing data that is output from the first through eighth bank arrays 310~380, and write drivers for writing data to the first through eighth bank arrays 310~380.

A codeword CW read from one bank array of the first through eighth bank arrays 310~380 is sensed by a sense amplifier coupled to the one bank array from which the data is to be read, and is stored in the read data latches. The codeword CW stored in the read data latches may be provided to the channel interface circuit 500 after ECC decoding is performed on the codeword CW by the ECC engine 400.

The data DQ to be written in one bank array of the first through eighth bank arrays 310~380 may be provided to the data input buffer 295 from the memory controller 100, and may be provided to the ECC engine 400 from the data input buffer 295. In this case, the ECC engine 400 may perform an ECC encoding on the data DQ to generate parity bits, the ECC engine 400 may provide the data DQ and the parity bits to the I/O gating circuit 290 and the I/O gating circuit 290 may write the data DQ and the parity bits in a sub-page in one bank array through the write drivers.

The data input buffer 295 may provide the data DQ from the memory controller 100 to the ECC engine 400 in a write operation of the semiconductor memory device 200, based on the clock signal CK. In an exemplary embodiment of the present inventive concept, the data input buffer 295 may selectively invert the data DQ and may provide the ECC engine 400 with inverted or non-inverted data DQ based on the data inversion bits DBI from the memory controller 100 in a write operation of the semiconductor memory device 200. The data input buffer 295 may include the data inversion decision circuit 130 and the data inversion circuit 135 in FIG. 2.

The data input buffer 295 may selectively invert the data DQ and may provide the ECC engine 400 with inverted or non-inverted data DQ based on the data inversion bits DBI in a data bit inversion mode. The data input buffer 295 may provide the ECC engine 400 with the data DQ without regard to the data inversion bits DBI in a non-data bit inversion mode.

The ECC engine 400 may read data from a portion (e.g., a sub-page) of a target page of the memory cell array 300 by a unit of a codeword, perform an ECC decoding on the data and may provide the channel interface circuit 500 with the decoding status flag DSF associated with whether at least one error bit is detected and/or corrected when the data includes the at least one error bit. The ECC engine 400 may provide the channel interface circuit 500 with a corrected read data C_DQ or a read data DQ. The ECC engine 400 corrects the at least one error bit to provide the corrected read data C_DQ to the channel interface circuit 500.

The channel interface circuit 500 receives the corrected read data C_DQ and the decoding status flag DSF and may transmit the read data DQ and the decoding status flag DSF along with link parity bits LPRT to the memory controller 100. In addition, channel interface circuit 500 may transmit the read data DQ and the decoding status flag DSF to the memory controller 100.

The control logic circuit 210 may control operations of the semiconductor memory device 200. For example, the control logic circuit 210 may generate control signals in order for the semiconductor memory device 200 to perform a write operation or a read operation. The control logic circuit 210 includes a command decoder 211 that decodes the command CMD from the memory controller 100 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may generate a first control signal CTL1 to control the I/O gating circuit 290, a second control signal CTL2 to control the ECC engine 400 and a third control signal CTL3 to control the channel interface circuit 500.

When the semiconductor memory device 200 is implemented with a SRAM device, the aforementioned circuits may be included in the semiconductor memory device 200.

Figure 4:
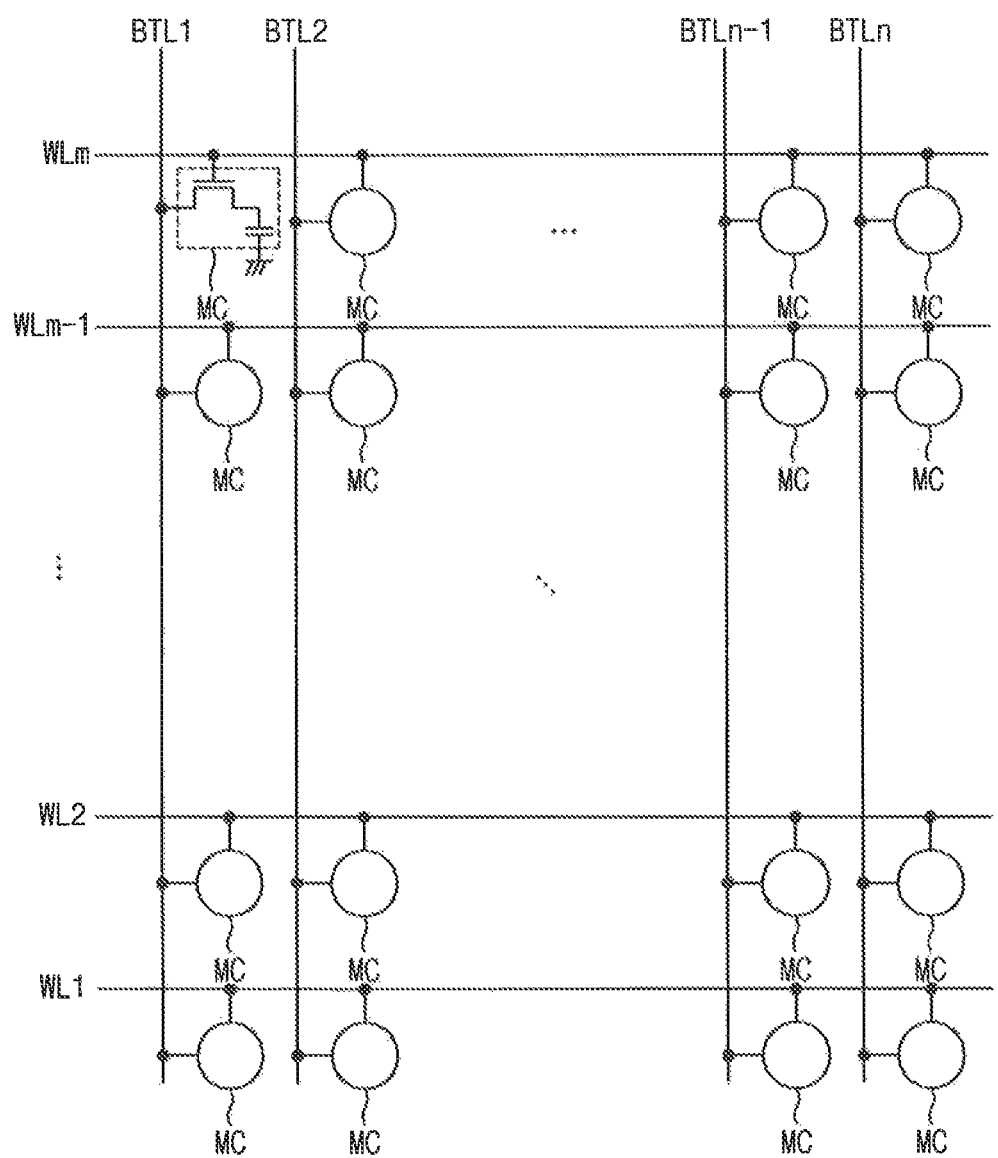
FIG. 4 illustrates a first bank array in the semiconductor memory device of FIG. 3, according to an exemplary embodiment of the present inventive concept.

FIG. 4 illustrates the first bank array in the semiconductor memory device of FIG. 3, according to an exemplary embodiment of the present inventive concept.

Referring to FIG. 4, a first bank array 310a includes a plurality of word-lines WL1~WLm (m is a natural number greater than two), a plurality of bit-lines BTL1~BTLn (n is a natural number greater than two), and a plurality of memory cells MCs disposed at intersections between the word-lines WL1~WLm and the bit-lines BTL1~BTLn. Each of the memory cells MCs includes a cell transistor coupled to each of the word-lines WL1~WLm and each of the bit-lines BTL1~BTLn and a cell capacitor coupled to the cell transistor.

Figure 5:
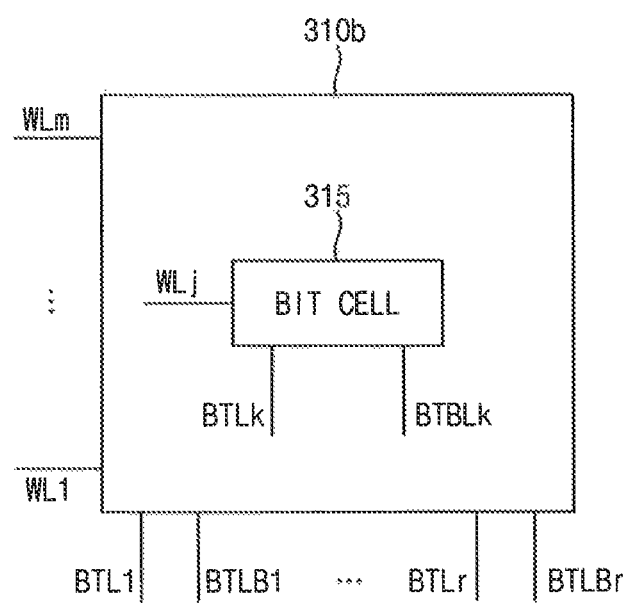
FIG. 5 illustrates the first bank array in the semiconductor memory device of FIG. 3, according to another exemplary embodiment of the present inventive concept.

FIG. 5 illustrates the first bank array in the semiconductor memory device of FIG. 3, according to another exemplary embodiment of the present inventive concept.

Referring to FIG. 5, a first bank array 310b includes a plurality of word-lines WL1~WLm, a plurality of bit-lines BTL1~BTLr (r is a natural number greater than two), a plurality of complementary bit-lines BTLB1~BTLBr and a plurality of bit cells 315 coupled to the word-lines WL1~WLm, the bit-lines BTL1~BTLr and the complementary bit-lines BTLB1~BTLBr. In FIG. 5, a bit cell 315 is coupled to a word-line WLj, a bit-line BTLk and a complementary bit-line BTLBk.

The semiconductor memory device 200 may be implemented with a DRAM or SRAM including an ECC engine therein.

Figure 6:
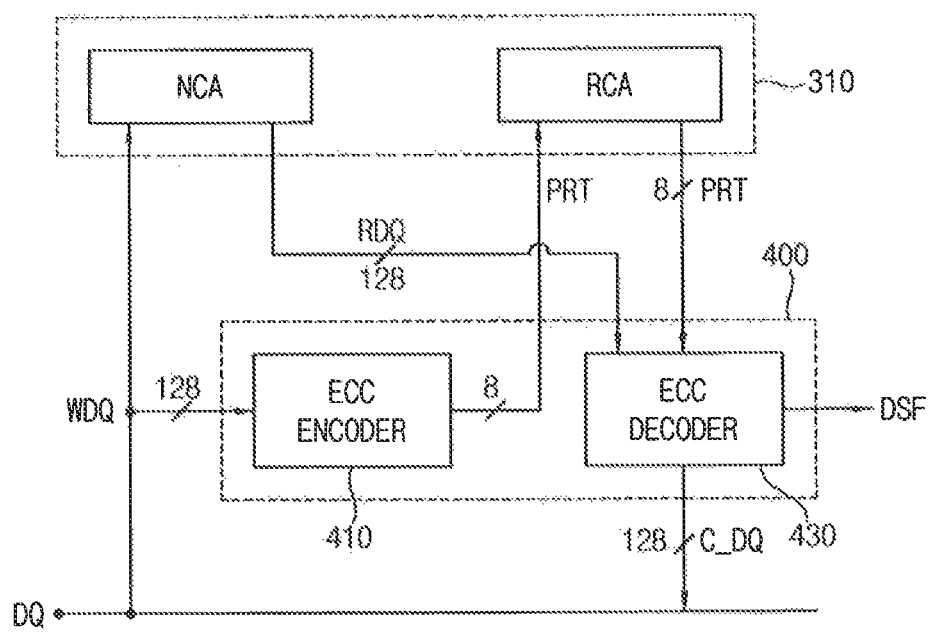
FIG. 6 is a block diagram illustrating an error correction code (ECC) engine in the semiconductor memory device of FIG. 3 according to an exemplary embodiment of the present inventive concept.

FIG. 6 is a block diagram illustrating an example of the ECC engine in the semiconductor memory device of FIG. 3 according to an exemplary embodiment of the present inventive concept.

In FIG. 6, the first bank array 310 is illustrated together with the ECC engine 400. The first bank array 310 may include a normal cell array NCA and a redundancy cell array RCA.

Referring to FIG. 6, the ECC engine 400 includes an ECC encoder 410 and an ECC decoder 430.

The ECC encoder 410 may generate parity bits PRT associated with a write data WDQ to be stored in the normal cell array NCA of the first bank array 310. The parity bits PRT may be stored in the redundancy cell array RCA of the first bank array 310.

The ECC decoder 430 may perform an ECC decoding on a read data RDQ based on the read data RDQ and the parity bits PRT read from the first bank array 310. When the read data RDQ includes at least one error bit as a result of the ECC decoding, the ECC decoder 430 may output the decoding status flag DSF associated with whether the at least one error bit is detected and/or corrected. The ECC decoder 430 may correct the at least one error bit in the read data RDQ to output a corrected data C_DQ.

In an exemplary embodiment of the present inventive concept, the ECC decoder 430 may provide an external decoding status flag decoder with error processing information associated with whether the at least one error bit is detected and/or corrected. In this case, the decoding status flag decoder may generate the decoding status flag DSF based on the error processing information.

Figure 7:
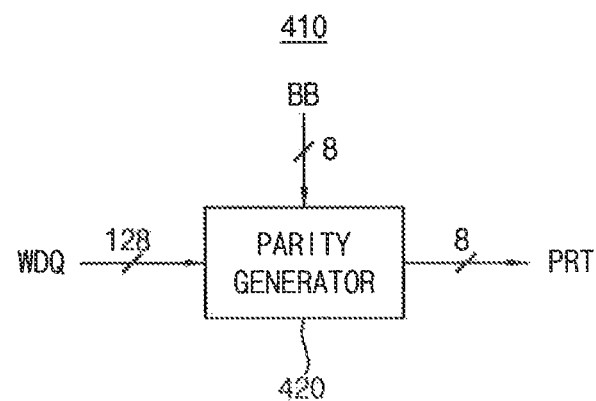
FIG. 7 illustrates an ECC encoder in the ECC engine of FIG. 6 according to an exemplary embodiment of the present inventive concept.

FIG. 7 illustrates the ECC encoder in the ECC engine of FIG. 6 according to an exemplary embodiment of the present inventive concept.

Referring to FIG. 7, the ECC encoder 410 may include a parity generator 420. The parity generator 420 receives 128-bit write data WDQ and 8-bit basis bits BB and generates the 8-bit parity bits PRT by performing, for example, an XOR array operation. The basis bits BB are bits for generating the parity bits PRT with respect to the 128-bit write data WDQ and may include b'0000000. The basis bits BB may include other bits instead of b'0000000.

Figure 8:
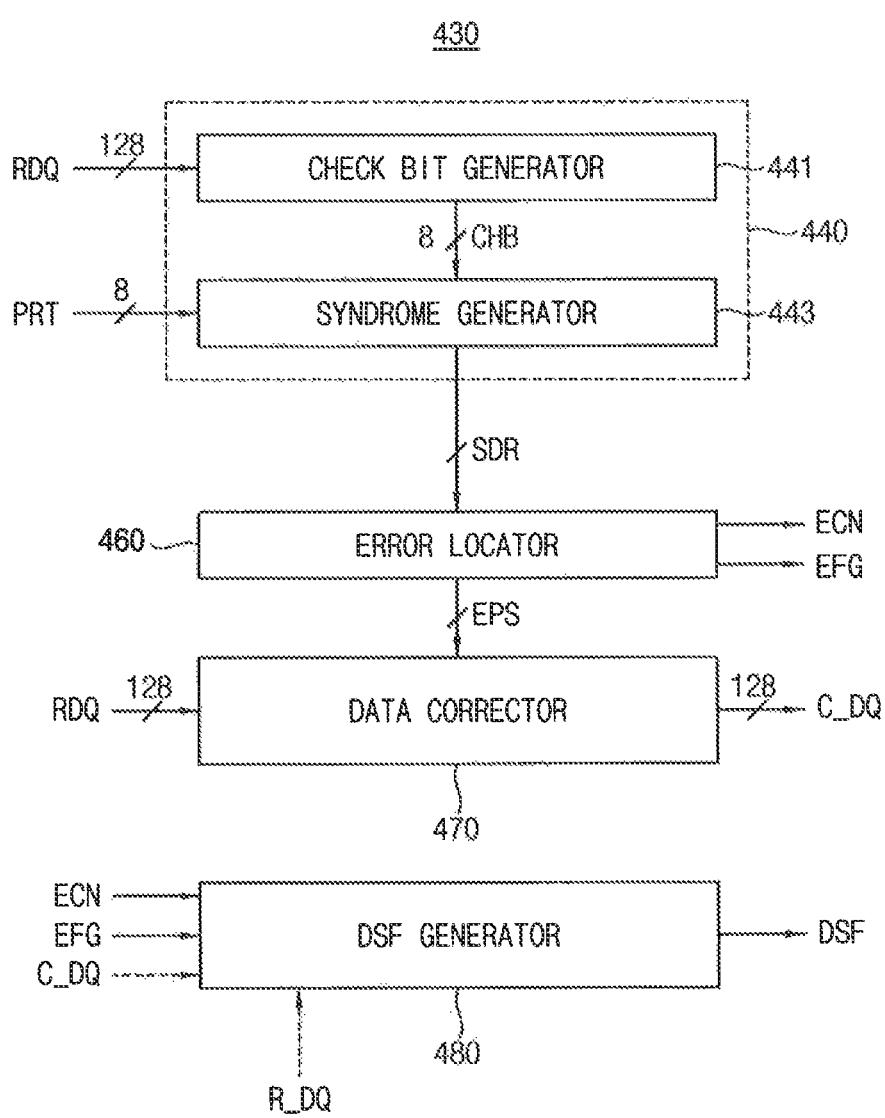
FIG. 8 illustrates the ECC decoder in the ECC engine of FIG. 6 according to another exemplary embodiment of the present inventive concept.

FIG. 8 illustrates an example of the ECC decoder in the ECC engine of FIG. 6 according to an exemplary embodiment of the present inventive concept.

Referring to FIG. 8, the ECC decoder 430 may include a syndrome generation circuit 440, an error locator 460, a data corrector 470 and a decoding status flag generator 480. The syndrome generation circuit 440 may include a check bit generator 441 and a syndrome generator 443.

The check bit generator 441 generates check bits CHB based on the read data RDQ by performing, an XOR array operation and the syndrome generator 443 generates a syndrome SDR by comparing corresponding bits of the parity bits PRT and the check bits CHB.

The error locator 460 generates an error position signal EPS indicating a position of an error bit in the read data RDQ and provides the error position signal EPS to the data corrector 470 when all bits of the syndrome SDR are not 'zero'. In addition, when the read data RDQ includes at least one error bit, the error locator 460 providers an error count signal ECN and an error flag signal EFG to the decoding status flag generator 480. The error count signal ECN may indicate a number of the least one error bit and the error flag signal EFG may indicate whether the at least one error bit is within an error correction capability of the ECC decoder 430.

The error locator 460 may receive the address ADDR and may provide the channel interface circuit 500 with an address of a codeword including the at least one error bit as an error address when all bits of the syndrome SDR are not 'zero'. The channel interface circuit 500 may store the error address in a register therein and may provide the memory controller 100 with the error address stored in the register under control of the control logic circuit 210. The error address may refer to EADDR in FIG. 3, for example.

The data corrector 470 receives the read data RDQ, corrects the error bit in the read data RDQ based on the error position signal EPS when the read data RDQ includes the error bit and outputs the corrected data C_DQ. In addition, the data corrector 470 may provide the read data RDQ and the corrected data C_DQ to the decoding status flag generator 480.

Figure 9:
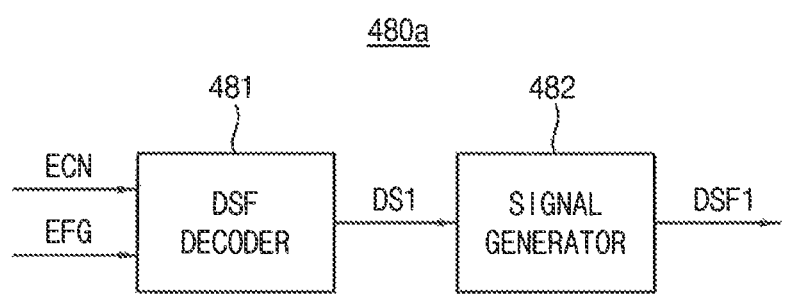
FIG. 9 illustrates a decoding status flag generator in FIG. 8 according to an exemplary embodiment of the present inventive concept.

FIG. 9 illustrates the decoding status flag generator in FIG. 8 according to an exemplary embodiment of the inventive concept.

Referring to FIG. 9, a decoding status flag generator 480a may include a decoding status flag decoder 481 and a signal generator 482.

The decoding status flag decoder 481 receives the error count signal ECN and the error flag signal EFG and decodes the error count signal ECN and the error flag signal EFG to generate a decoding signal DS1. The signal generator 482 receives the decoding signal DS1 and generates a decoding status flag DSF1 based on the decoding signal DS1 indicating a number of error bits, a type of the error bits and whether the error bits are corrected. The decoding signal DS1 includes a plurality of bits which indicate a number of the error bits, a type of the error bits and whether the error bits are corrected.

Figure 10:
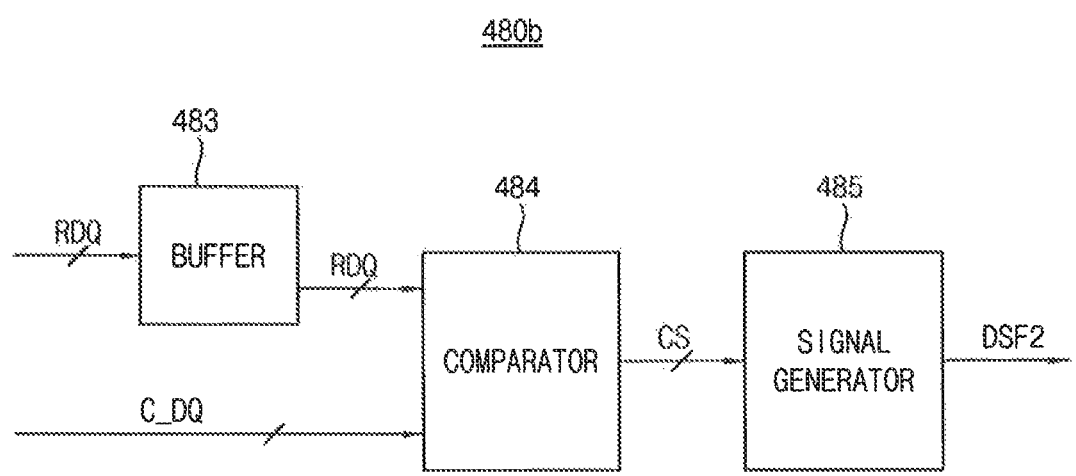
FIG. 10 illustrates the decoding status flag generator in FIG. 8 according to another exemplary embodiment of the present inventive concept.

FIG. 10 illustrates the decoding status flag generator in FIG. 8 according to another exemplary embodiment of the present inventive concept.

Referring to FIG. 10, a decoding status flag generator 480b may include a buffer 483, a comparator 484 and a signal generator 485.

The buffer 483 stores the read data RDQ and provides the read data RDQ to the comparator 484. The comparator 484 compares corresponding bits between the read data RDQ and the corrected data C_DQ and outputs a comparison signal CS indicating a result of the comparison.

The signal generator 485 receives the comparison signal CS and generates a decoding status flag DSF2 based on a number of bits having a high level in the comparison signal CS. The decoding status flag DSF2 may represent a number of error bits in the read data RDQ.

Figure 11:
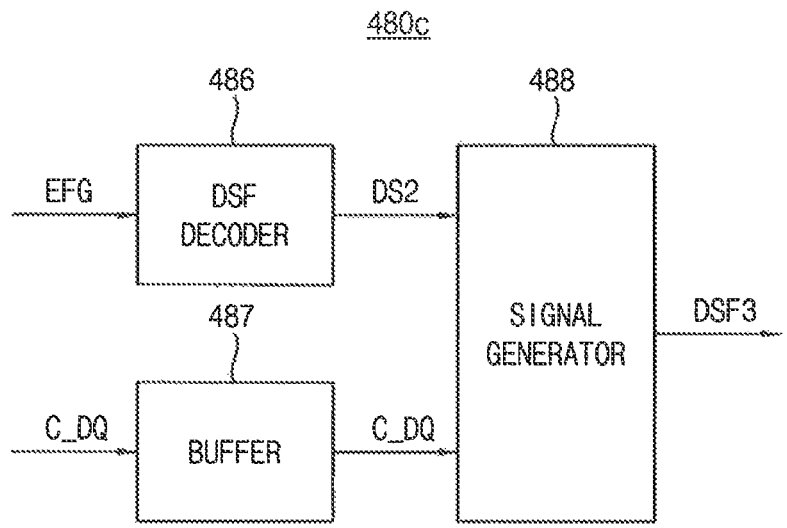
FIG. 11 illustrates the decoding status flag generator in FIG. 8 according to another exemplary embodiment of the present inventive concept.

FIG. 11 illustrates the decoding status flag generator in FIG. 8 according to another exemplary embodiment of the present inventive concept.

Referring to FIG. 11, a decoding status flag generator 480c may include a decoding status flag decoder 486, a buffer 487 and a signal generator 488.

The decoding status flag decoder 486 receives the error flag signal EFG and decodes the error flag signal EFG indicating whether the error bits are correctable to generate a decoding signal DS2. The buffer 487 stores the corrected data C_DQ to provide the corrected data C_DQ to the signal generator 487.

The signal generator 487 receives the decoding signal DS2 and the corrected data C_DQ to generate a decoding status flag DSF3 based the decoding signal DS2 indicating whether the error bits are correctable and the corrected data C_DQ. The decoding status flag DSF3 includes a plurality of bits which indicates a number of data bits having a first logic level or a number of data bits having a second logic level in the corrected data C_DQ.

Figure 12:
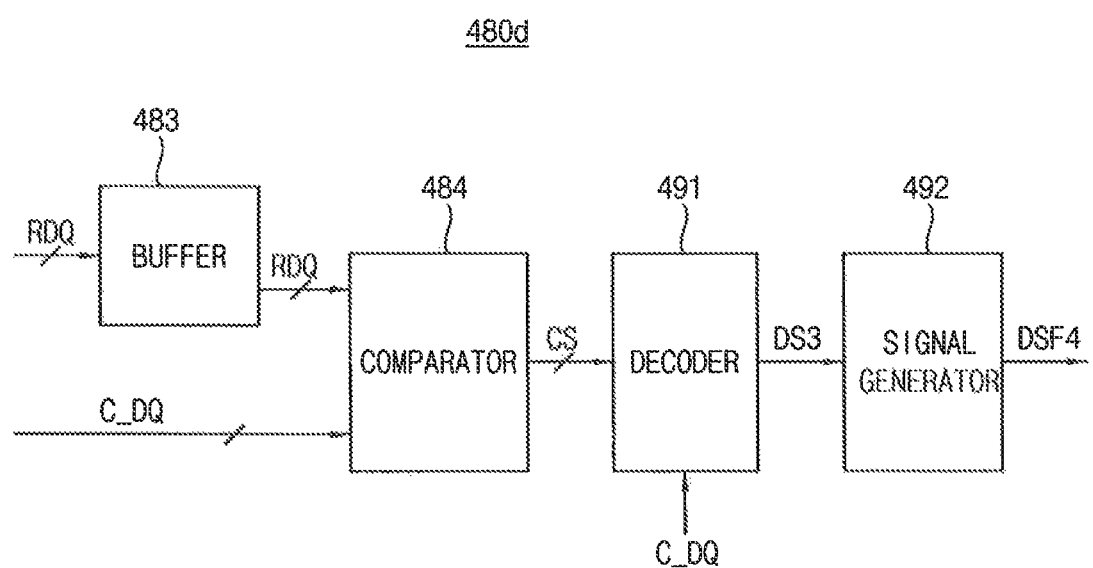
FIG. 12 illustrates the decoding status flag generator in FIG. 8 according to another exemplary embodiment of the present inventive concept.

FIG. 12 illustrates the decoding status flag generator in FIG. 8 according to another exemplary embodiment of the inventive concept.

Referring to FIG. 12, a decoding status flag generator 480d may include a buffer 483, a comparator 484, a decoder 491 and a signal generator 492.

The buffer 483 stores the read data RDQ and provides the read data RDQ to the comparator 484. The comparator 484 compares corresponding bits between the read data RDQ and the corrected data C_DQ and outputs a comparison signal CS indicating a result of the comparison.

The decoder 491 receives the comparison signal CS and the corrected read data C_DQ and decodes the comparison signal CS and the corrected read data C_DQ to generate a decoding signal DS3.

The signal generator 492 receives the decoding signal DS3 to generate a decoding status flag DSF4 based on the decoding signal DS3. Therefore, the decoding status flag DSF4 indicates a number of data bits having a first logic level in the read data RDQ being read as data bits having a second logic level or a number of data bits having a second logic level in the read data RDQ being read as data bits having a first logic level.

Figure 13:
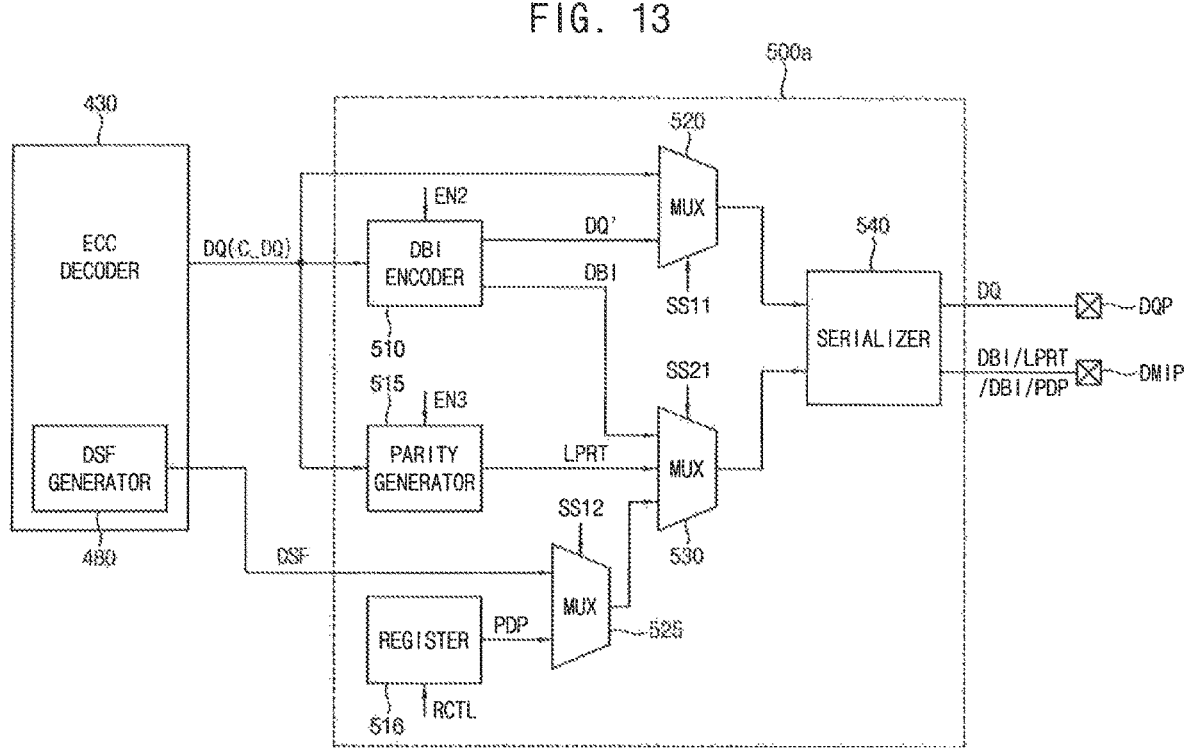
FIG. 13 is a block diagram illustrating a channel interface circuit in the semiconductor memory device of FIG. 3 according to an exemplary embodiment of the present inventive concept.

FIG. 13 is a block diagram illustrating the channel interface circuit in the semiconductor memory device of FIG. 3 according to an exemplary embodiment of the present inventive concept.

In FIG. 13, the ECC decoder 430 is illustrated together with a channel interface circuit 500a. Although FIG. 13 shows the decoding status flag generator 480 in the ECC decoder 430, the decoding status flag generator 480 may be disposed outside of the ECC decoder 430.

Referring to FIG. 13, the channel interface circuit 500a may include a data bit inversion encoder 510, a parity generator 515, a register 516, multiplexers 520, 525 and 530 and a serializer 540.

The ECC decoder 430 may output the data DQ or the corrected data C_DQ and the decoding status flag generator 480 outputs the decoding status flag DSF.

The data bit inversion encoder 510, when enabled in response to an enable signal EN2, selectively inverts the data DQ or the corrected data C_DQ and outputs data DQ' and data inversion bits DBI indicating whether the data DQ' is inverted. The data bit inversion encoder 510 may include a data inversion decision circuit and a data inversion circuit.

The parity generator 515 may generate the link parity bits LPRT associated with link ECC for detecting and correcting errors generated in a link or an interface based on the data DQ or the corrected data C_DQ. The register 516 may store a pre-defined pattern PDP and may output the pre-defined pattern PDP in response to a register control signal RCTL.

The multiplexer 520 receives the data DQ and inverted data DQ' and provides the data DQ to the serializer 540 in the non-data inversion mode and provides the inverted data DQ' to the serializer 540 in the data inversion mode in response to a selection signal SS1.

The multiplexer 525 receives the decoding status flag DSF and the pre-defined pattern PDP and provides one of the decoding status flag DSF and the pre-defined pattern PDP to the multiplexer 530 in response to a selection signal SS12.

The multiplexer 530 receives the data inversion bits DBI, the link parity bits LPRT and an output of the multiplexer 525. The multiplexer 530 provides the data inversion bits DBI to the serializer 540 in the data bit inversion mode and provides the link parity bits LPRT and the output of the multiplexer 525 to the serializer 540 in the non-data inversion mode, in response to a selection signal SS21. The multiplexer 530 performs a time-division multiplexing on the link parity bits LPRT and the output of the multiplexer 525 in the non-data inversion mode.

The serializer 540 serializes an output of the multiplexer 520 and transmits the serialized output of the multiplexer 520 to the memory controller 100 through a data pin DQP and serializes an output of the multiplexer 530 and transmits the serialized output of the multiplexer 530 to the memory controller 100 through a data mask and inversion pin DMIP.

In an exemplary embodiment of the present inventive concept, the parity generator 515 may be disabled in response to an enable signal EN3. In this case, the channel interface circuit 500a may transmit once the decoding status flag DSF to the memory controller 100 through the data mask and inversion pin DMIP, repeatedly transmit the decoding status flag DSF to the memory controller 100 through the data mask and inversion pin DMIP, or transmit the pre-defined pattern PDP to the memory controller 100 through the data mask and inversion pin DMIP.

The third control signal CTL3 in FIG. 3 may include the selection signals SS11, SS12 and SS21, the register control signal RCTL and the enable signals EN2 and EN3.

Figure 14:
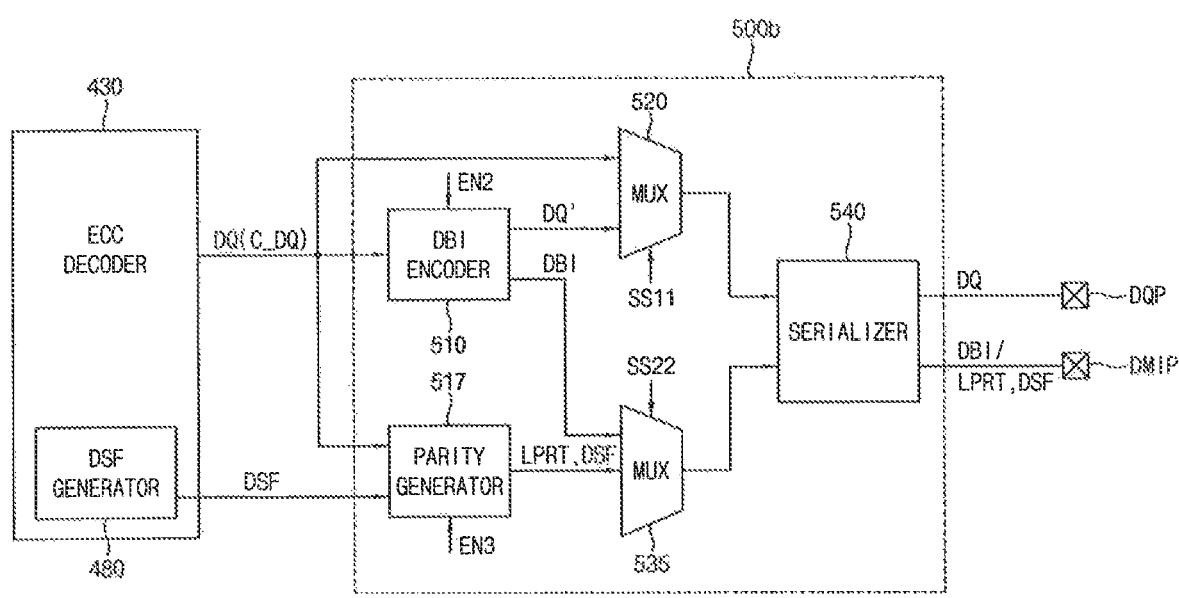
FIG. 14 is a block diagram illustrating another example of the channel interface circuit in the semiconductor memory device of FIG. 3 according to example embodiments of the present inventive concept.

FIG. 14 is a block diagram illustrating the channel interface circuit in the semiconductor memory device of FIG. 3 according to another exemplary embodiment of the present inventive concept.

In FIG. 14, the ECC decoder 430 is illustrated together with a channel interface circuit 500b. Although FIG. 14 shows the decoding status flag generator 480 included in the ECC decoder 430, the decoding status flag generator 480 may be disposed outside of the ECC decoder 430.

Referring to FIG. 14, the channel interface circuit 500b may include the data bit inversion encoder 510, a parity generator 517, multiplexers 520 and 535 and the serializer 540.

The ECC decoder 430 may output the data DQ or the corrected data C__DQ and the decoding status flag generator 480 of the ECC decoder 430 outputs the decoding status flag DSF.

The data bit inversion encoder 510, when enabled in response to an enable signal EN2, selectively inverts the data DQ or the corrected data C_DQ and outputs the data DQ' and the data inversion bits DBI indicating whether the data DQ' is inverted.

The parity generator 517, when enabled in response to an enable signal EN3, may generate the link parity bits LPRT based on the data DQ or the corrected data C_DQ and the decoding status flag DSF and outputs the link parity bits LPRT and the decoding status flag DSF. The parity generator 517 may perform an ECC encoding on the decoding status flag DSF based on the data DQ or the corrected data C_DQ. Therefore, the link parity bits LPRT may protect the decoding status flag DSF from errors which may occur during its transmission.

The multiplexer 520 receives the data DQ and inverted data DQ' and provides the data DQ to the serializer 540 in the non-data inversion mode and provides the inverted data DQ' in the data inversion mode in response to a selection signal SS11.

The multiplexer 535 receives the data inversion bits DBI, the link parity bits LPRT and the decoding status flag DSF. The multiplexer 535 provides the data inversion bits DBI to the serializer 540 in the data bit inversion mode and provides the link parity bits LPRT and the decoding status flag DSF to the serializer 540 in the non-data inversion mode, in response to a selection signal SS22.

The serializer 540 serializes an output of the multiplexer 520 and transmits the serialized output of the multiplexer 520 to the memory controller 100 through the data pin DQP and serializes an output of the multiplexer 530 and transmits the serialized output of the multiplexer 530 to the memory controller 100 through the data mask and inversion pin DMIP.

The third control signal CTL3 in FIG. 3 may include the selection signals SS11 and SS22 and the enable signals EN2 and EN3.

FIGS. 15 through 19 respectively illustrate the channel interface circuit transmitting the decoding status flag to the memory controller, according to an exemplary embodiment of the present inventive concept.

In FIGS. 15 through 19, the memory controller 100 provides a write clock signal WCK together with the command CMD, and a read latency RL represents a delay corresponding to a gap between a time point when a read command RD is received and a time point when the data DQ is output. In addition, the semiconductor memory device 200 transmits a read strobe signal RDQS to the memory controller 100 along with the data DQ.

Figure 15:
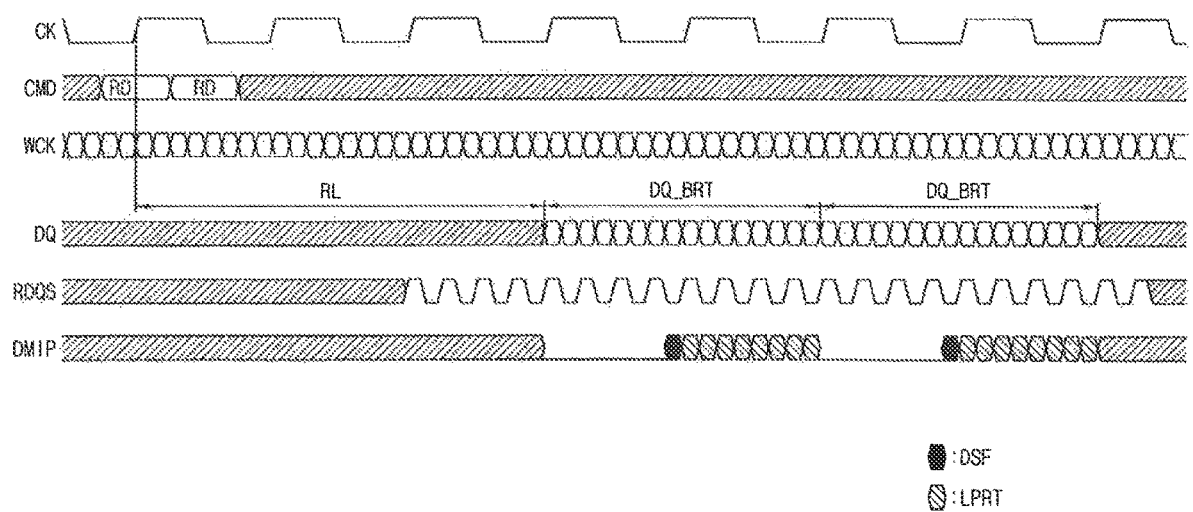
FIGS. 15, 16, 17, 18 and 19 respectively illustrate the channel interface circuit transmitting a decoding status flag to the memory controller, according to an exemplary embodiment of the present inventive concept.

Referring to FIG. 15, when the data DQ is transmitted to the memory controller 100 by a unit of a burst DQ_BRT, the channel interface circuit 500 transmits the decoding status flag DSF and the link parity bits LPRT to the memory controller 100 through the data mask and inversion pin DMIP by performing time-division multiplexing on the decoding status flag DSF and the link parity bits LPRT.

Figure 16:
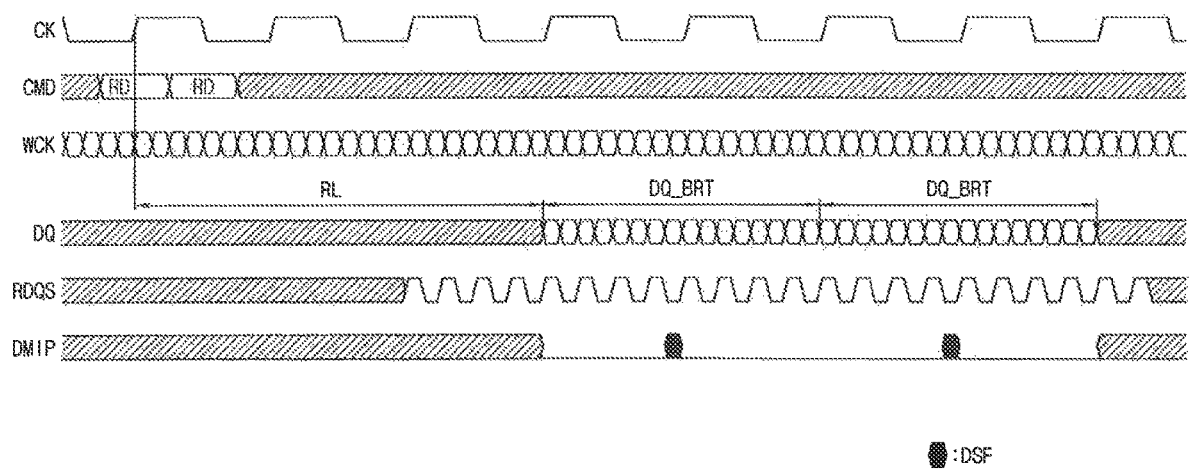

Referring to FIG. 16, when the parity generator 515 in FIG. 13 is disabled and the data DQ is transmitted to the memory controller 100 by a unit of a burst DQ_BRT, the channel interface circuit 500 transmits the decoding status flag DSF to the memory controller 100 through the data mask and inversion pin DMIP.

Figure 17:
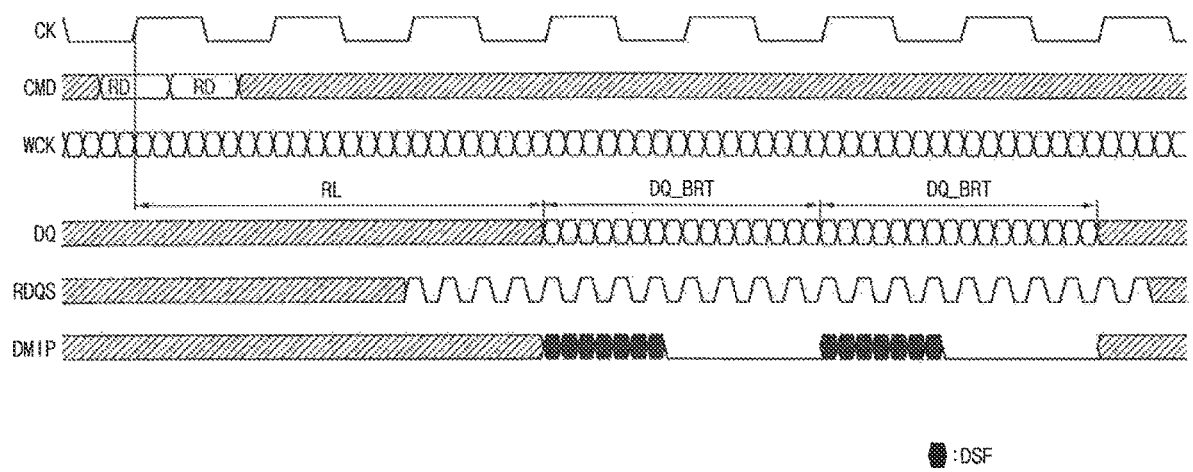

Referring to FIG. 17, when the parity generator 515 in FIG. 13 is disabled and the data DQ is transmitted to the memory controller 100 by a unit of a burst DQ_BRT, the channel interface circuit 500 repeatedly transmits the decoding status flag DSF to the memory controller 100 through the data mask and inversion pin DMIP.

Figure 18:
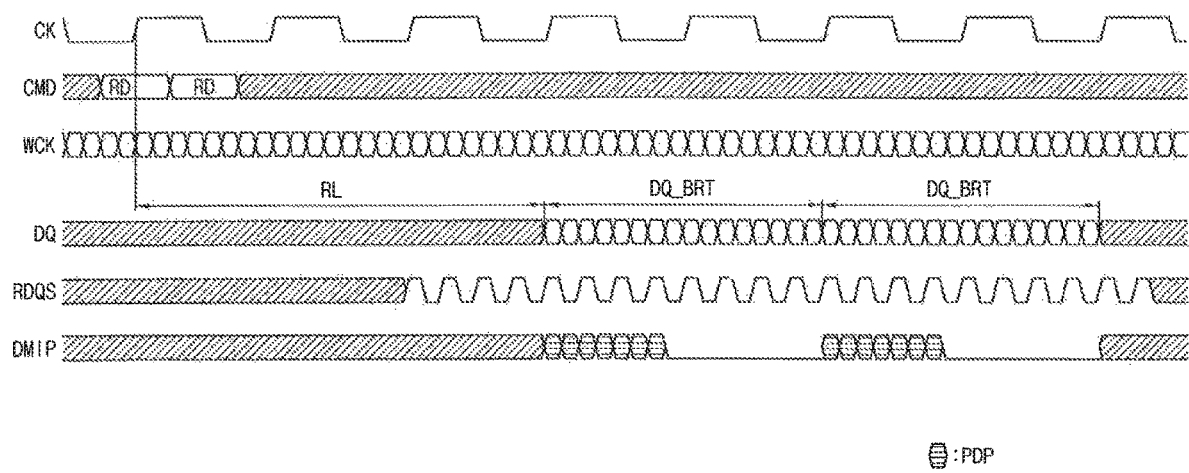

Referring to FIG. 18, when the parity generator 515 in FIG. 13 is enabled, the multiplexer 525 selects the predefined pattern PDP and the data DQ is transmitted to the memory controller 100 by a unit of a burst DQ_BRT. In this case, the channel interface circuit 500 transmits the predefined pattern PDP to the memory controller 100 through the data mask and inversion pin DMIP.

Figure 19:
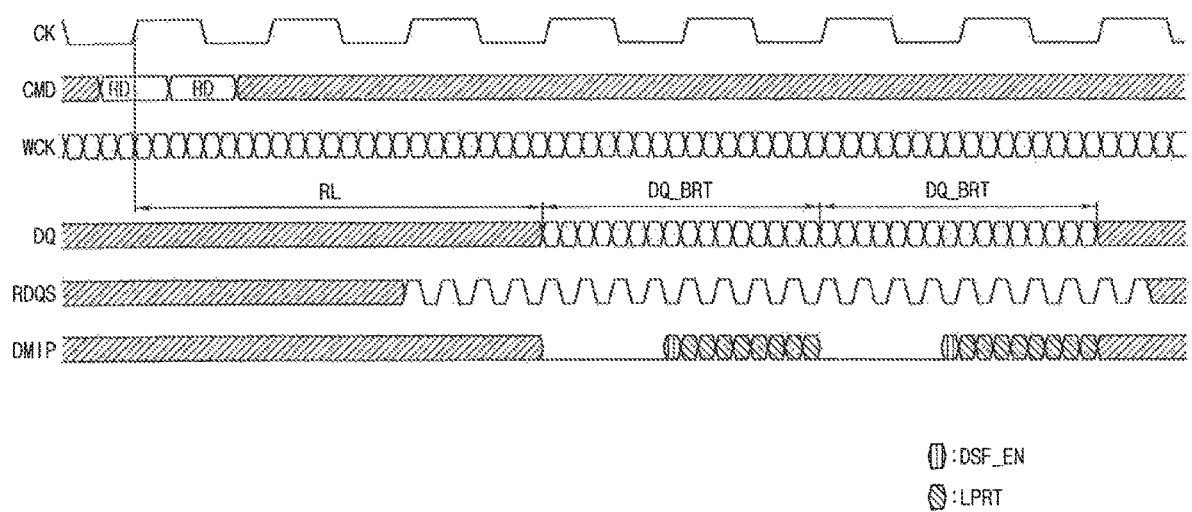

Referring to FIG. 19, when the parity generator 517 in FIG. 14 is enabled, parity generator 517 encodes the decoding status flag DSF based on the data DQ. In this case, the channel interface circuit 500 transmits an encoded decoding status flag DSF_EN and the link parity bits LPRT to the memory controller 100 through the data mask and inversion pin DMIP by performing time-division multiplexing on the encoded decoding status flag DSF_EN and the link parity bits LPRT.

Figure 20:
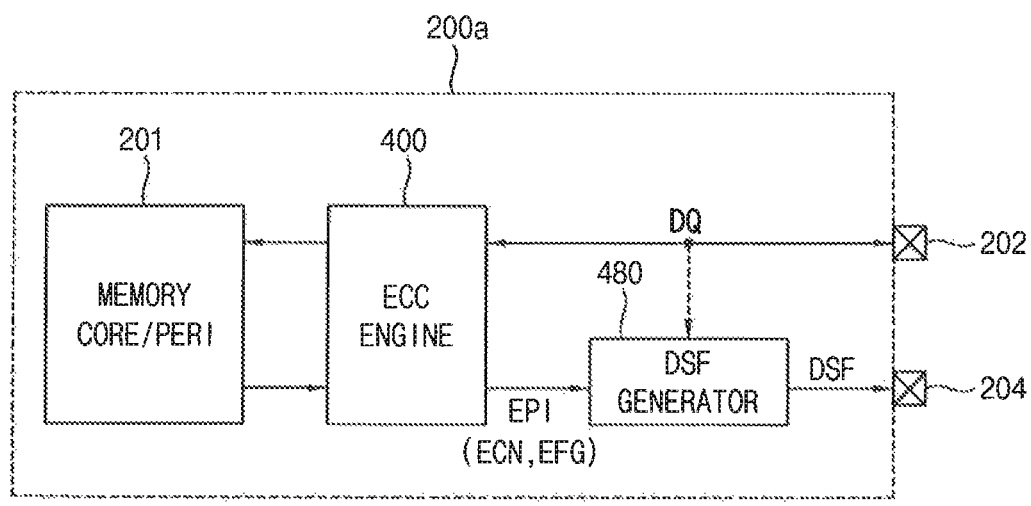
FIGS. 20, 21 and 22 respectively illustrate the semiconductor memory device of FIG. 3 transmitting the decoding status flag to the memory controller, according to an exemplary embodiment of the present inventive concept.
Figure 21:
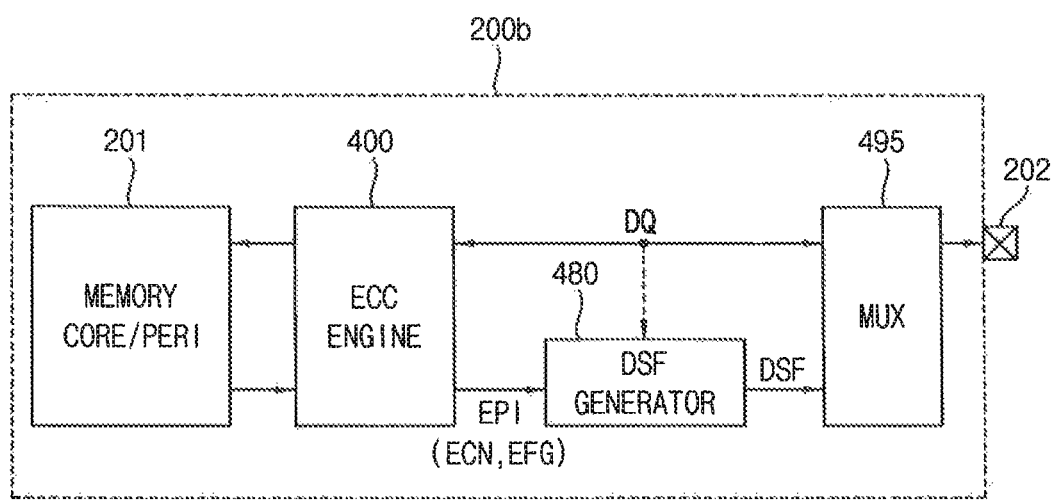
Figure 22:
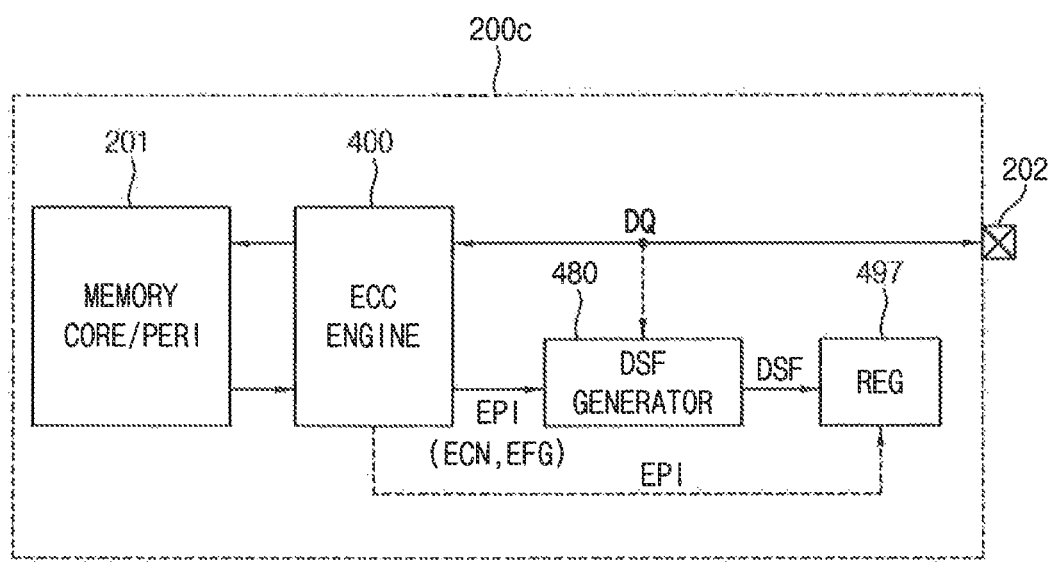

FIGS. 20 through 22 respectively illustrate the semiconductor memory device of FIG. 3 transmitting the decoding status flag to the memory controller, according to an exemplary embodiment of the present inventive concept.

In FIGS. 20 through 22, a memory core/peri 201 may include elements except the ECC engine 400, the channel interface circuit 500 and the data input buffer 295 of the semiconductor memory device 200 of FIG. 3.

Referring to FIG. 20, in a semiconductor memory device 200a, the ECC engine 400 provides the decoding status flag generator 480 with error processing information EPI including at least the error count signal ECN and the error flag signal EFG. In this case, the decoding status flag generator 480 generates the decoding status flag DSF based on the error processing information EPI, and transmits the decoding status flag DSF to the memory controller 100 through a first pin 204 in real time. The semiconductor memory device 200a may transmit/receive the data DQ to/from the memory controller 100 through a second pin 202. The first pin 204 may be a data mask and inversion pin, a data bit inversion pin or a data mask pin. The decoding status flag generator 480 may perform time-division multiplexing on the link parity bits LPRT and the decoding status flag DSF to be transmitted to the memory controller 100.

Referring to FIG. 21, in a semiconductor memory device 200b, the ECC engine 400 provides the decoding status flag generator 480 with error processing information EPI including at least the error count signal ECN and the error flag signal EFG.

The decoding status flag generator 480 generates the decoding status flag DSF based on the error processing information EPI and/or data DQ, and multiplexer 495 transmits the data DQ and the decoding status flag DSF to the memory controller 100 through a pin 202 by performing time-division multiplexing on the data DQ and the decoding status flag DSF. The pin 202 may be a data pin.

Referring to FIG. 22, in a semiconductor memory device 200c, the ECC engine 400 provides the decoding status flag generator 480 with error processing information EPI including at least the error count signal ECN and the error flag signal EFG.

The decoding status flag generator 480 generates the decoding status flag DSF based on the error processing information EPI and/or data DQ, and stores the decoding status flag DSF in a register 497. The ECC engine 400 may store the error processing information EPI in the register 497. The error processing information EPI may further include a syndrome and an error address associated with at least one error bit.

The control logic circuit 210 in FIG. 3 controls the register 497 such that the decoding status flag DSF may be transmitted to the memory controller 100 periodically or at a specific time.

Figure 23:
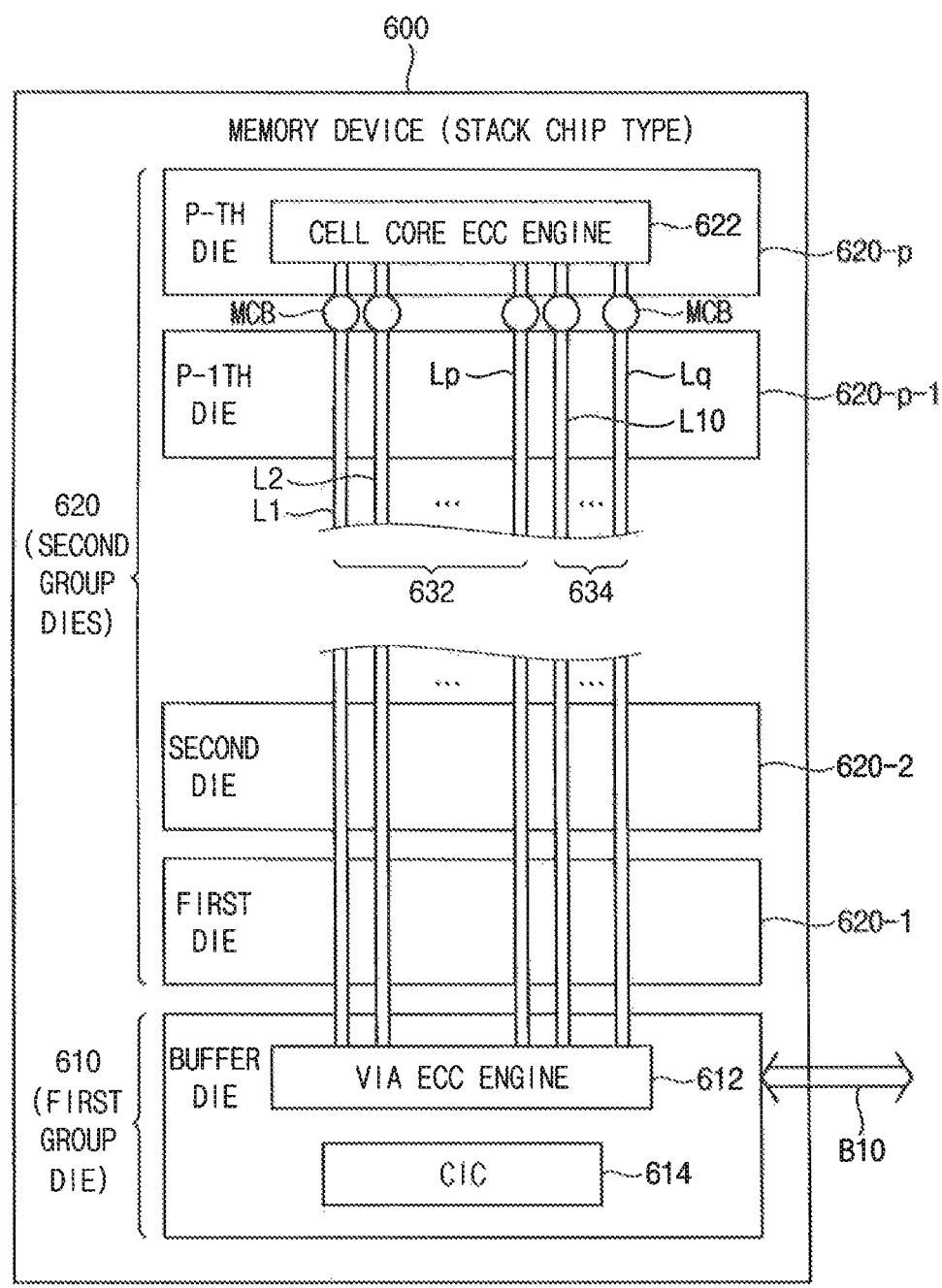
FIG. 23 is a block diagram illustrating a semiconductor memory device according to an exemplary embodiment of the present inventive concept.

FIG. 23 is a block diagram illustrating a semiconductor memory device according to an exemplary embodiment of the present inventive concept.

Referring to FIG. 23, a semiconductor memory device 600 may include a first group die 610 and second group dies 620 for providing a soft error analyzing and correcting function in a stacked chip structure.

The first group die 610 may include at least one buffer die. The second group dies 620 may include a plurality of memory dies 620-1 to 620-p which is stacked on the first group die 610 and conveys data through a plurality of through silicon via (TSV) lines.

At least one of the memory dies 620-1 to 620-p may include a first type ECC engine 622 which generates transmission parity bits (e.g., transmission parity data) based on transmission data to be sent to the first group die 610. The first type ECC engine 622 may be referred to as 'cell core ECC engine'. The first type ECC engine 622 may employ the ECC engine 400 of FIG. 6.

The buffer die 610 may include a channel interface circuit 614 and a second type ECC engine 612 which corrects a transmission error using the transmission parity bits when a transmission error is detected in the transmission data received through the TSV lines and generates error-corrected data.

The second type ECC engine 612 may be referred to as 'via ECC engine'. The channel interface circuit 614 may employ one of the channel interface circuit 500a of FIG. 13 and the channel interface circuit 500b of FIG. 14.

The semiconductor memory device 600 may be a stack chip type memory device or a stacked memory device which conveys data and control signals through the TSV lines. The TSV lines may be also called 'through electrodes'.

When a read data from the memory die 620-p includes at least one error bit, the first type ECC engine 622 may transmit a decoding status flag to the channel interface circuit 614. In this case, the decoding status flag is associated with whether the at least one error bit is detected and/or corrected.

The first type ECC engine 622 may perform error correction on data which is outputted from the memory die 620-p before the transmission data is sent.

A transmission error which occurs in the transmission data may be due to noise which occurs at the TSV lines. Since data fail due to the noise occurring in the TSV lines may be distinguishable from data fail due to a false operation of the memory die, the data fail due to noise may be regarded as a soft data fail (or a soft error). The soft data fail may be generated due to a transmission fail on a transmission path, and may be detected and remedied by an ECC operation.

For example, when the transmission data is 128-bit data, the transmission parity bits may be set to 8 bits. However, in accordance with an exemplary embodiment of the inventive concept, the number of transmission parity bits may be more or less than 8 bits.

Still referring to FIG. 23, a data TSV line group 632 which is formed at one memory die 620-p may include 128 TSV lines L1 to Lp, and a parity TSV line group 634 may include 8 TSV lines L10 to Lq. The TSV lines L1 to Lp of the data TSV line group 632 and the parity TSV lines L10 to Lq of the parity TSV line group 634 may be connected to micro bumps MCB which are formed on the memory dies 620-1 to 620-p.

At least one of the memory dies 620-1 to 620-p may include DRAM cells each including at least one access transistor and one storage capacitor.

The semiconductor memory device 600 may have a 3D chip structure or a 2.5D chip structure to communicate with the host through a data bus B10. The buffer die 610 may be connected with a memory controller through the data bus B10. The channel interface circuit 614 transmits the decoding status flag to the memory controller through the bus B10 in real time.

The first type ECC engine 622, denoted as the cell core ECC engine, may output transmission parity bits as well as the transmission data through the parity TSV line group 634 and the data TSV line group 632 respectively. The outputted transmission data may be data which is error-corrected by the first type ECC engine 622.

The second type ECC engine 612, denoted as the via ECC engine, may determine whether a transmission error occurs in the transmission data received through the data TSV line group 632, based on the transmission parity bits received through the parity TSV line group 634. When a transmission error is detected, the second type ECC engine 612 may correct the transmission error of the transmission data using the transmission parity bits. When the transmission error is uncorrectable, the second type ECC engine 612 may output information indicating the occurrence of an uncorrectable data error.

When an error is detected from read data in a high bandwidth memory (HBM) or the stacked memory structure, the error may be due to noise present while data is transmitted through the TSV lines.

According to an exemplary embodiment of the present inventive concept, as illustrated in FIG. 23, the cell core ECC engine 622 is included in the memory die, and the via ECC engine 612 is included in the buffer die. Accordingly, it is possible to detect and correct a soft data fail. The soft data fail may include a transmission error which is generated due to noise when data is transmitted through TSV lines.

The buffer die 610 may include a memory controller such as the memory controller 100 of FIG. 2.

In an exemplary embodiment of the present inventive concept, the semiconductor memory device 600 may employ a stacked memory device such as a hybrid memory cube (HMC). In this case, a buffer die in the HMC includes a memory controller and a memory die in the HMC includes a channel interface circuit and an ECC engine.

Figure 24:
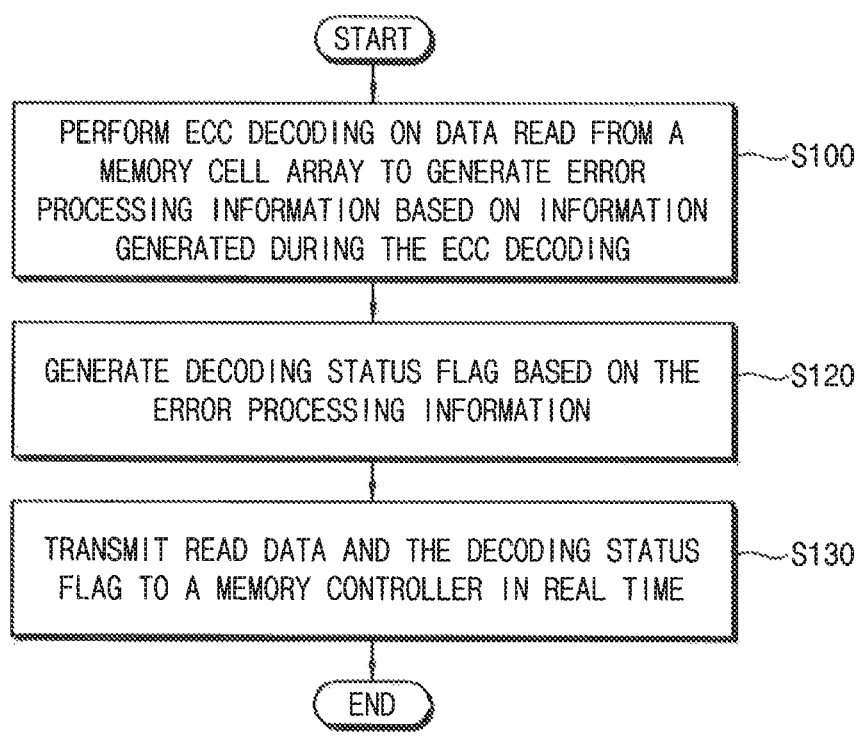
FIG. 24 is a flow chart illustrating a method of operating a semiconductor memory device according to an exemplary embodiment of the present inventive concept.

FIG. 24 is a flow chart illustrating a method of operating a semiconductor memory device according to an exemplary embodiment of the present inventive concept.

Referring to FIGS. 3 through 24, in a method of operating a semiconductor memory device 200 including a memory cell array 300, an ECC engine 400 and a channel interface circuit 500, the ECC engine 400 performs an ECC decoding on data DQ read from the memory cell array 300 to generate error processing information EPI based on information generated in the ECC decoding (S110). The error processing information EPI, when the read data includes at least one error bit, may include information associated with whether the at least one error bit is detected and/or corrected.

A decoding status flag generator 480 inside or outside of the ECC engine 400 generates a decoding status flag DSF associated with whether the at least one error bit is detected and/or corrected based on the error processing information EPI and provides the decoding status flag DSF to the channel interface circuit 500 (S120).

The channel interface circuit 500 transmits the read data DQ and the decoding status flag DSF to the memory controller 100 in real time (S130).

The channel interface circuit 500 may transmit the decoding status flag DSF to the memory controller 100 through the data mask and inversion pin DMIP through which the semiconductor memory device 200 receives data inversion bits DBI.

The channel interface circuit 500 may transmit link parity bits LPRT and the decoding status flag DSF through the data mask and inversion pin DMIP by performing time-division multiplexing on the link parity bits LPRT and the decoding status flag DSF. The channel interface circuit 500 may transmit only the decoding status flag DSF to the memory controller 100 through the data mask and inversion pin DMIP, or may repeatedly transmit the decoding status flag DSF to the memory controller 100 through the data mask and inversion pin DMIP.

Therefore, the semiconductor memory device 200 may transmit, to the memory controller 100, information associated with whether at least one error bit is detected and/or corrected in real time and the memory controller 100 may monitor an address associated with the occurrence of the at least one error bit in real time. Accordingly, the semiconductor memory device 200 may have increased credibility and performance.

Figure 25:
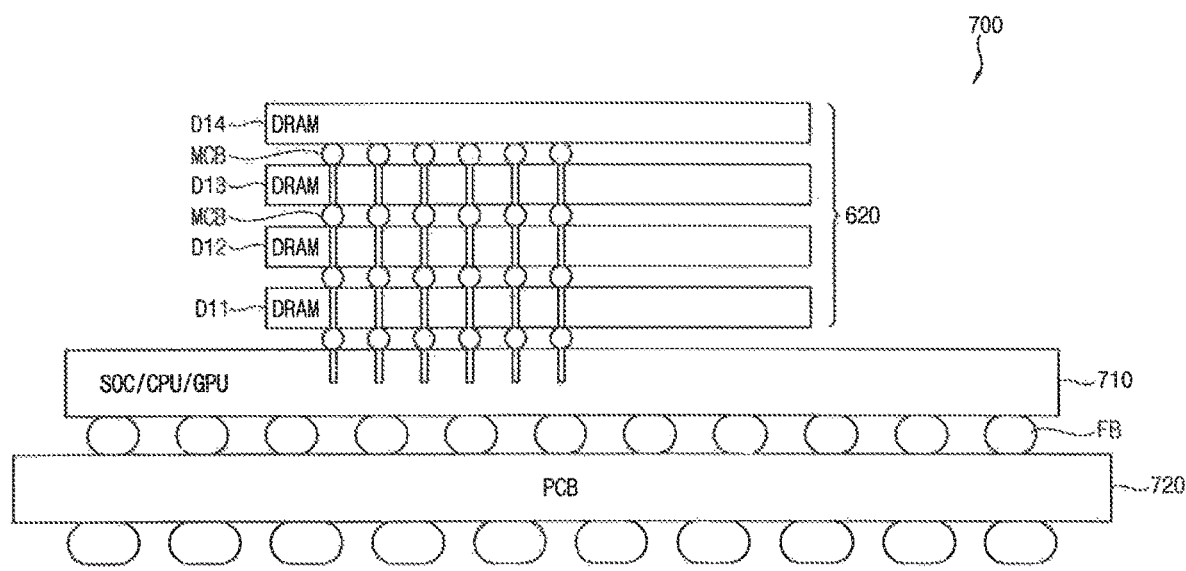
FIG. 25 is a cross-sectional view of a three-dimensional (3D) chip structure employing the semiconductor memory device of FIG. 23 according to an exemplary embodiment of the present inventive concept.

FIG. 25 is a cross-sectional view of a 3D chip structure employing the semiconductor memory device of FIG. 23 according to an exemplary embodiment of the present inventive concept.

FIG. 25 shows a 3D chip structure 700 in which a host and an HBM are directly connected without an interposer layer.

Referring to FIG. 25, a host die 710 such as a system-on-chip (SoC), a central processing unit (CPU), or a graphic processing unit (GPU) may be disposed on a printed circuit board (PCB) 720 using flip chip bumps FB. Memory dies D11 to D14 may be stacked on the host die 710 to implement an HBM structure 620. In FIG. 25, the buffer die 610 or a logic die of FIG. 23 is omitted. However, the buffer die 610 or the logic die may be disposed between the memory die D11 and the host die 710. To implement the HBM structure 620, TSV lines may be formed at the memory dies D11 and D14. The TSV lines may be electrically connected with micro bumps MCB placed between memory dies D11 and D14.

Figure 26:
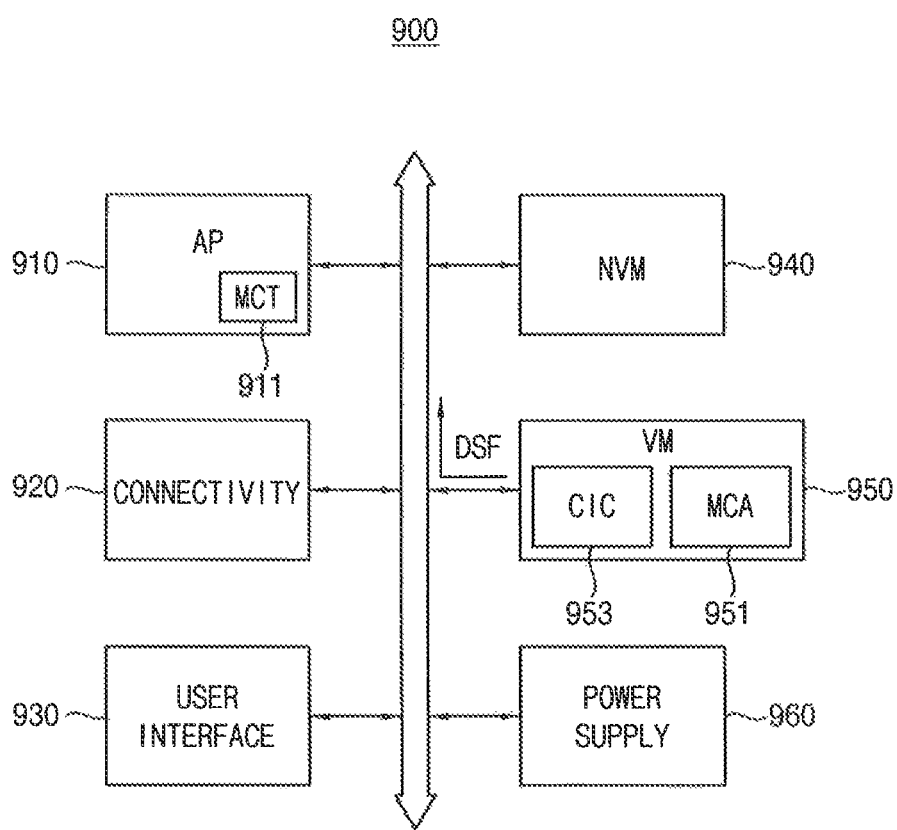
FIG. 26 is a block diagram illustrating a mobile system including the semiconductor memory device according to an exemplary embodiment of the present inventive concept.

FIG. 26 is a block diagram illustrating a mobile system including the semiconductor memory device according to an exemplary embodiment of the present inventive concept.

Referring to FIG. 26, a mobile system 900 may include an application processor 910, a connectivity circuit 920, a volatile memory device 950, a nonvolatile memory device 940, a user interface 930 and a power supply 960. The application processor may include a memory controller 911. The volatile memory device 950 may include a memory cell array 951 and a channel interface circuit 953.

The application processor 910 may execute applications, such as a web browser, a game application, a video player, etc. The application processor 910 includes the memory controller 911 to control the volatile memory device 950.

The connectivity circuit 920 may perform wired or wireless communication with an external device.

The volatile memory device 950 may store data processed by the application processor 910 or operate as a working memory. The volatile memory device 950 may employ the semiconductor memory device 200 of FIG. 3. The channel interface circuit 953 may transmit, to the memory controller 911, a decoding status flag DSF associated with whether at least one error bit in the memory cell array 951 is detected and/or corrected in real time.

The nonvolatile memory device 940 may store a boot image for booting the mobile system 900.

The user interface 930 may include at least one input device, such as a keypad, a touch screen, etc., and at least one output device, such as a speaker, a display device, etc. The power supply 960 may supply a power supply voltage to the mobile system 900.

The mobile system 900 or components of the mobile system 900 may be mounted using various types of packages.

As mentioned above, according to exemplary embodiments of the present inventive concept, the semiconductor memory device 200 may transmit, to the memory controller 100, information associated with whether at least one error bit is detected and/or corrected in real time and the memory controller 100 may monitor an address associated with the occurrence of the error bit in real time. Accordingly, the semiconductor memory device 200 may increase credibility and performance.

Exemplary embodiments of the present inventive concept may be applied to systems using semiconductor memory devices that employ an ECC engine.

While the present inventive concept has been described with reference to exemplary embodiments thereof, those skilled in the art will readily appreciate that many modifications are possible without departing from the scope of the present inventive concept as defined by the following claims.

What is claimed is:

1. A semiconductor memory device, comprising:
   a memory cell array including a plurality of memory cells;
   an error correction code (ECC) engine configured to correct at least one error bit in read data and configured to generate a decoding status flag indicating that the at least one error bit is corrected, wherein the read data is read from the memory cell array;
   a channel interface circuit configured to receive the read data and the decoding status flag from the ECC engine and configured to transmit the read data and the decoding status flag to a memory controller, wherein the channel interface circuit is configured to transmit the decoding status flag and link parity bits to the memory controller through a first pin while transmitting the read data through a second pin, wherein the first pin is a data mask and inversion pin and the second pin is a data pin; and
   a control logic circuit configured to control the ECC engine and the channel interface circuit in response to an address and a command provided from the memory controller.

2. The semiconductor memory device of claim 1, wherein the first pin is a pin through which the semiconductor memory device is configured to transmit a data inversion bit associated with the read data and through which the semiconductor memory device is configured to receive a data mask signal from the memory controller,
   wherein the channel interface circuit includes a parity generator configured to generate the link parity bits for correcting errors based on the read data, which occur when transmitting the read data to the memory controller, and
   wherein the channel interface circuit is configured to transmit the decoding status flag and the link parity bits to the memory controller through the first pin.

3. The semiconductor memory device of claim 2, wherein the channel interface circuit is configured to transmit the decoding status flag and the link parity bits to the memory controller through the first pin by performing time-division multiplexing on the decoding status flag and the link parity bits.

4. The semiconductor memory device of claim 2, wherein the control logic circuit is configured to disable the parity generator, and
the channel interface circuit is configured to transmit the decoding status flag to the memory controller through the first pin.

5. The semiconductor memory device of claim 4, wherein the channel interface circuit is configured to repeatedly transmit the decoding status flag to the memory controller through the first pin.

6. The semiconductor memory device of claim 2, wherein the channel interface circuit further includes a register to store a first pattern corresponding to the decoding status flag, and
the channel interface circuit is configured to transmit the first pattern to the memory controller through the first pin.

7. The semiconductor memory device of claim 1, wherein the first pin is a pin through which the semiconductor memory device is configured to transmit a data inversion bit associated with the read data,
wherein the channel interface circuit includes a parity generator configured to generate the link parity bits for correcting errors based on the read data, which occur when transmitting the decoding status flag to the memory controller, and
wherein the channel interface circuit is configured to transmit the decoding status flag and the link parity bits to the memory controller through the first pin.

8. The semiconductor memory device of claim 7, wherein the channel interface circuit is configured to transmit the decoding status flag and the link parity bits to the memory controller through the first pin by performing time-division multiplexing on the decoding status flag and the link parity bits.

9. The semiconductor memory device of claim 1, wherein the ECC engine is configured to generate the decoding status flag based on a syndrome and an error position signal which are associated with the at least one error bit when the read data includes the at least one error bit.

10. The semiconductor memory device of claim 1, wherein the ECC engine includes:
an ECC decoder configured to correct the at least one error bit based on the read data and parity bits associated with the read data; and
a decoding status flag generator configured to generate the decoding status flag based on an error count signal and an error flag signal, the error count signal indicating whether the at least one error bit is detected, the error flag signal indicating whether the at least one error bit is correctable, and
wherein the ECC decoder is configured to provide the error count signal and the error flag signal to the decoding status flag generator.

11. The semiconductor memory device of claim 1, wherein the ECC engine includes:
an ECC decoder configured to correct the at least one error bit based on the read data and parity bits associated with the read data; and
a decoding status flag generator configured to generate the decoding status flag based on a comparison of the read data and corrected read data,
wherein the ECC decoder generates the corrected read data after correcting the at least one error bit in the read data, and wherein the ECC decoder is configured to provide the corrected read data to the decoding status flag generator.

12. The semiconductor memory device of claim 11, wherein the decoding status flag indicates a number of data bits read as having a first logic level as data bits having a second logic level or a number of data bits read as having the second logic level as data bits having the first logic level.

13. The semiconductor memory device of claim 1, wherein the ECC engine includes:
an ECC decoder configured to correct the at least one error bit based on the read data and parity bits associated with the read data; and
a decoding status flag generator configured to generate the decoding status flag based on an error flag signal and corrected read data, wherein the ECC decoder generates the corrected read data after correcting the at least one error bit in the read data, and wherein the error flag signal indicates whether the at least one error bit is correctable, and
wherein the ECC decoder is configured to provide the error flag signal and the corrected read data to the decoding status flag generator.

14. The semiconductor memory device of claim 1, wherein each of the plurality of memory cells includes a dynamic memory cell or a static memory cell.

15. The semiconductor memory device of claim 1, comprising:
first group dies including at least one buffer die; and
second group dies including a plurality of memory dies, the plurality of memory dies stacked on the first group dies and conveying data through a plurality of through silicon via (TSV) lines,
wherein at least one of the plurality of memory dies includes the memory cell array and the ICC engine, and the ECC engine generates transmission parity bits using transmission data to be sent to the first group dies,
wherein the at least one buffer die includes a via ECC engine and the channel interface circuit, the via ECC engine configured to correct a transmission error using the transmission parity bits when the transmission error is detected from the transmission data received through the plurality of TSV lines.

16. A semiconductor memory device, comprising:
a memory cell array including a plurality of memory cells;
an error correction code (ECC) engine configured to detect at least one error bit in read data and configured to generate a decoding status flag indicative of whether the at least one error bit is detected, wherein the read data is read from the memory cell array;
a channel interface circuit configured to receive the read data and the decoding status flag from the ECC engine, configured to store the decoding status flag in a register therein and configured to transmit the read data to a memory controller; and
a control logic circuit configured to control the ECC engine and the channel interface circuit in response to an address and a command provided from the memory controller, and
wherein the control logic circuit is configured to control the channel interface circuit to transmit the decoding status flag and parity bits to the memory controller via a data mask and inversion pin while the channel interface circuit transmits the read data to the memory controller via a data pin.

17. The semiconductor memory device of claim 16, wherein the control logic circuit is configured to control the channel interface circuit to transmit the decoding status flag stored in the register to the memory controller periodically or at a pre-determined time.

18. A memory system, comprising:

a semiconductor memory device; and a memory controller configured to control the semiconductor memory device, wherein the semiconductor memory device includes:

a memory cell array including a plurality of memory cells;

an error correction code (ECC) engine configured to correct at least one error bit in read data and configured to generate a decoding status flag indicative of whether the at least one error bit is corrected, wherein the read data is read from the memory cell array;

a channel interface circuit configured to receive the read data and the decoding status flag from the ECC engine and configured to transmit the read data and the decoding status flag to the memory controller, wherein the channel interface circuit is configured to transmit the decoding status flag to the memory controller through a first pin, wherein the first pin is a data mask and inversion pin; and a control logic circuit configured to control the ECC engine and the channel interface circuit in response to an address and a command provided from the memory controller, wherein the control logic circuit is configured to control the channel interface circuit to transmit the decoding status flag and parity bits to the memory controller via the first pin while the channel interface circuit transmits the read data to the memory controller via a data pin, and wherein the memory controller is configured to determine an error management policy of the semiconductor memory device based on the decoding status flag.

19. The memory system of claim 18, wherein the memory controller includes:

a decoding status flag decoder configured to decode the decoding status flag to generate a decoding signal; and a central processing unit configured to determine the error management policy of the semiconductor memory device based on the decoding signal.

* * * * *